US010913511B2

(12) United States Patent
Iino et al.

(10) Patent No.: US 10,913,511 B2
(45) Date of Patent: Feb. 9, 2021

(54) HUMAN-POWERED VEHICLE CONTROL DEVICE

(71) Applicant: Shimano Inc., Osaka (JP)

(72) Inventors: Yoshinori Iino, Osaka (JP); Keiji Terashima, Osaka (JP); Takaaki Fujiwara, Osaka (JP); Tetsuya Kitani, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/185,377

(22) Filed: Nov. 9, 2018

(65) Prior Publication Data

US 2019/0152560 A1    May 23, 2019

(30) Foreign Application Priority Data

Nov. 16, 2017   (JP) .................................. 2017-221367

(51) Int. Cl.
| | |
|---|---|
| *B62M 6/50* | (2010.01) |
| *B62J 99/00* | (2020.01) |
| *H02P 29/00* | (2016.01) |
| *B62M 6/45* | (2010.01) |
| *B62M 25/08* | (2006.01) |
| *B62M 9/122* | (2010.01) |
| *B62M 9/132* | (2010.01) |
| *B62M 6/90* | (2010.01) |
| *B62M 6/55* | (2010.01) |
| *B62J 45/20* | (2020.01) |

(52) U.S. Cl.
CPC .............. *B62M 6/50* (2013.01); *B62J 99/00* (2013.01); *B62M 6/45* (2013.01); *B62M 9/122* (2013.01); *B62M 9/132* (2013.01); *B62M 25/08* (2013.01); *H02P 29/0016* (2013.01); *B62J 45/20* (2020.02); *B62M 6/55* (2013.01); *B62M 6/90* (2013.01)

(58) Field of Classification Search
USPC ......................................................... 318/560
See application file for complete search history.

(56) References Cited

U.S. PATENT DOCUMENTS

| | | | | |
|---|---|---|---|---|
| 3,921,745 A | * | 11/1975 | McCulloch | B60L 7/12 180/206.1 |
| 5,266,065 A | * | 11/1993 | Ancarani Restelli | B62J 99/00 474/78 |

(Continued)

FOREIGN PATENT DOCUMENTS

| | | |
|---|---|---|
| CN | 107054552 A | 8/2017 |
| DE | 10 2015 106 496 A1 | 10/2015 |

(Continued)

OTHER PUBLICATIONS

Robert Bosch GmbH: HMI Drive Unit Battery Pack Charger; Original Instructions; Jan. 2011.

(Continued)

*Primary Examiner* — Bentsu Ro
(74) *Attorney, Agent, or Firm* — Global IP Counselors, LLP

(57) ABSTRACT

A human-powered vehicle control device includes an electronic controller configured to control a motor that assists in propulsion of a human-powered vehicle in accordance with a human driving force input to the human-powered vehicle. The electronic controller is configured to switch at least five control states imparting different output characteristics to the motor with respect to the human driving force.

23 Claims, 6 Drawing Sheets

(56) References Cited

U.S. PATENT DOCUMENTS

| | | | | |
|---|---|---|---|---|
| 5,474,148 | A | * | 12/1995 | Takata ............... B62M 6/45 |
| | | | | 180/206.2 |
| 9,769,898 | B1 | * | 9/2017 | Buthker ............ H05B 33/0845 |
| 2004/0267421 | A1 | * | 12/2004 | Eskritt ............... B62D 5/065 |
| | | | | 701/41 |
| 2008/0112694 | A1 | * | 5/2008 | Kang ................. H02P 6/06 |
| | | | | 388/811 |
| 2013/0311019 | A1 | | 11/2013 | Tanaka et al. |
| 2015/0120119 | A1 | | 4/2015 | Tauchi et al. |
| 2016/0347411 | A1 | | 12/2016 | Yamamoto et al. |

FOREIGN PATENT DOCUMENTS

| | | |
|---|---|---|
| DE | 10 2015 118 150 A1 | 5/2016 |
| EP | 2 562 027 A2 | 2/2013 |
| JP | 6-272486 A | 9/1994 |
| JP | 2000-118481 A1 | 4/2000 |
| JP | 3974974 B2 | 9/2007 |
| JP | 2012-144061 A | 8/2012 |
| JP | 2013-43486 A | 3/2013 |
| JP | 2013-241045 A | 12/2013 |
| JP | 2015-110402 A | 6/2015 |

OTHER PUBLICATIONS

Robert Bosch GmbH: Nyon Betriebsanleitung Online Version; Original Instructions; Apr. 2016.

\* cited by examiner

HUMAN-POWERED VEHICLE CONTROL DEVICE

CROSS-REFERENCE TO RELATED APPLICATIONS

This application claims priority to Japanese Patent Application No. 2017-221367, filed on Nov. 16, 2017. The entire disclosure of Japanese Patent Application No. 2017-221367 is hereby incorporated herein by reference.

BACKGROUND

Technical Field

The present disclosure generally relates to a human-powered vehicle control device.

Background Information

A control device for a human-powered vehicle disclosed in Japanese Laid-Open Patent Publication No. 2012-144061 (patent document 1) controls a motor that assists propulsion of the human-powered vehicle in three modes.

SUMMARY

The control device for a human-powered vehicle described above can switch the output characteristics of the motor in correspondence with the three modes. However, further improved usability is required. One object of the present disclosure is to provide a control device for a human-powered vehicle contributing to usability.

A human-powered vehicle control device for a human-powered vehicle in accordance with a first aspect of the present disclosure includes an electronic controller configured to control a motor that assists in propulsion of the human-powered vehicle in accordance with a human driving force input to the human-powered vehicle. The electronic controller is configured to switch at least five control states imparting different output characteristics to the motor with respect to the human driving force. In accordance with the first aspect, since the at least five control states imparting different output characteristics to the motor with respect to the human driving force can be switched, an assist force suitable for the condition and preference of the user is output to the motor. This contributes to usability.

In accordance with a second aspect, in the human-powered vehicle control device according to the first aspect, the electronic controller is further configured to control the motor such that a drive ratio of an output of the motor to the human driving force is different in the at least five control states. In accordance with the second aspect, it is possible to switch the at least five control states having different ratios of the output of the motor to the human driving force. This contributes to usability.

In accordance with a third aspect, the human-powered vehicle control device according to the second aspect includes a first memory device configured to changeably store the drive ratio of each of the at least five control states. The first memory device is configured so that the drive ratio is changeably stored in the first memory device by an external device. In accordance with the third aspect, the ratios of each of the at least five control states can be changed to a suitable ratio by the external device. That is, it is possible to customize the output characteristics of the motor with respect to the human driving force according to the preference of the user.

In accordance with a fourth aspect, in the human-powered vehicle control device according to the second or third aspect, the electronic controller is configured to control the motor so that the ratio is smaller than or equal to 300% in five or more states out of the at least five control states. In accordance with the fourth aspect, the five or more control states are included in a range where the ratio is smaller than or equal to 300%, which can contribute to usability.

In accordance with a fifth aspect, in the human-powered vehicle control device according to any one of the first to fourth aspects, the electronic controller is configured to change a maximum output of the motor in the at least five control states. In accordance with the fifth aspect, it is possible to switch the at least five control states having different maximum outputs of the motor. This contributes to usability.

In accordance with a sixth aspect, the human-powered vehicle control device according to the fifth aspect further includes a second memory device configured to changeably store the maximum output of the motor for each of the at least five control states. The second memory device is configured so that the maximum output of the motor is changeably stored in the first memory device by an external device. In accordance with the sixth aspect, the maximum output of the motor for each of the at least five control states can be changed to an appropriate maximum output by the external device. That is, it is possible to customize the output characteristics of the motor with respect to the human driving force according to the preference of the user.

In accordance with a seventh aspect, in the human-powered vehicle control device according to the fifth or sixth aspect, the electronic controller is configured to control the motor so that the maximum output of the motor is smaller than or equal to 500 watts in five or more control states out of the at least five control states. In accordance with the seventh aspect, the five or more control states are included in a range where the maximum output of the motor is smaller than or equal to 500 watts. This contributes to usability.

In accordance with an eighth aspect, in the human-powered vehicle control device according to the seventh aspect, the electronic controller is configured to control the motor so that the maximum output of the motor is smaller than or equal to 200 watts in the five or more control states. In accordance with the eighth aspect, the five or more control states are included in a range where the maximum output of the motor is smaller than or equal to 200 watts. This contributes to usability.

A human-powered vehicle control device for a human-powered vehicle in accordance with a ninth aspect of the present disclosure includes an electronic controller configured to control a motor that assists in propulsion of the human-powered vehicle in accordance with human driving force input to the human-powered vehicle. The electronic controller is configured to switch at least three control states imparting different output characteristics to the motor with respect to the human driving force. The electronic controller is configured to control the motor so that a drive ratio of an output of the motor to the human driving force input to the human-powered vehicle is different in each of the at least three control states. The at least three control states include a first control state where the drive ratio is a first ratio, a second control state where the drive ratio is a second ratio larger than the first ratio, and a third control state where the drive ratio is a third ratio larger than the second ratio. A difference between the first ratio and the second ratio and a difference between the second ratio and the third ratio are each smaller than or equal to 30%. In accordance with the ninth aspect, since the difference between the first ratio and the second ratio and the difference between the second ratio and the third ratio are each smaller than or equal to 30%, in a state where the control state is switched from the first control state to the second control state and in a state where the control state is switched from the second control state to the third control state, the ratio can be finely changed as compared with a state where the difference in ratio is larger than 30%.

In accordance with a tenth aspect, in the human-powered vehicle control device according to the ninth aspect, the difference between the first ratio and the second ratio and the difference between the second ratio and the third ratio are each less than 10%. In accordance with the tenth aspect, since the difference between the first ratio and the second ratio and the difference between the second ratio and the third ratio are each smaller than or equal to 10%, in a state where the control state is switched from the first control state to the second control state and in a state where the control state is switched from the second control state to the third control state, the ratio is further finely changed.

In accordance with an eleventh aspect, in the human-powered vehicle control device according to the ninth or tenth aspect, the at least three control states further include a fourth control state where the ratio is a fourth ratio larger than the third ratio, and a difference between the fourth ratio and the third ratio is larger than 30% and smaller than or equal to 300%. In accordance with the eleventh aspect, since the difference between the fourth ratio and the third ratio is larger than 30% and smaller than or equal to 300%, in a state where the control state is switched from the third control state to the fourth control state, it is possible to increase the change in ratio more than in a state where the control state is switched from the first control state to the second control state and in a state where the control state is switched from the second control state to the third control state.

A human-powered vehicle control device for a human-powered vehicle in accordance with a twelfth aspect of the present disclosure includes an electronic controller configured to control a motor that assists in propulsion of the human-powered vehicle in accordance with a human driving force input to the human-powered vehicle. The electronic controller is configured to switch at least three control states imparting different output characteristics to the motor with respect to the human driving force. Further, the electronic controller is configured to control the motor so that a maximum output of the motor is different in each of the at least three control states. The at least three control states include a first control state where the maximum output of the motor is a first predetermined value, a second control state where the maximum output of the motor is a second predetermined value larger than the first predetermined value, and a third control state where the maximum output of the motor is a third predetermined value larger than the second predetermined value. A difference between the first predetermined value and the second predetermined value and a difference between the second predetermined value and the third predetermined value are each smaller than or equal to 30 watts. In accordance with the twelfth aspect, since the difference between the first predetermined value and the second predetermined value and the difference between the second predetermined value and the third predetermined value are each smaller than or equal to 30 watts, in a state where the control state is switched from the first control state to the second control state and in a state where the control state is switched from the second control state to the third control state, the maximum output of the motor is further finely changed as compared with a state where the maximum output of the motor is changed larger than 30 watts.

In accordance with a thirteenth aspect, in the human-powered vehicle control device according to the twelfth aspect, the difference between the first predetermined value and the second predetermined value and the difference between the second predetermined value and the third predetermined value are each smaller than or equal to 20 watts. In accordance with the thirteenth aspect, since the difference between the first predetermined value and the second predetermined value and the difference between the second predetermined value and the third predetermined value are each smaller than or equal to 20 watts, in a state where the control state is switched from the first control state to the second control state and in a state where the control state is switched from the second control state to the third control state, the maximum output of the motor is further finely changed.

In accordance with a fourteenth aspect, in the human-powered vehicle control device according to the twelfth or thirteenth aspect, the at least three control states further include a fourth control state where the maximum output of the motor is a fourth predetermined value larger than the third predetermined value, and a difference between the third predetermined value and the fourth predetermined value is larger than 30 watts and smaller than or equal to 200 watts. In accordance with the fourteenth aspect, since the difference between the fourth predetermined value and the three predetermined value is larger than 30 watts and smaller than or equal to 200 watts, in a state where the control state is switched from the third control state to the fourth control state, the maximum output of the motor can be greatly changed as compared with a state where the control state is switched from the first control state to the second control state and a state where the control state is switched from the second control state to the third control state.

In accordance with a fifteenth aspect, in the human-powered vehicle control device according to any one of the ninth to fourteenth aspects, the electronic controller is configured to switch the at least five control states imparting different output characteristics to the motor with respect to the human driving force. In accordance with the fifteenth aspect, it is possible to switch the at least five control states having different motor maximum output. This contributes to usability.

In accordance with a sixteenth aspect, in the human-powered vehicle control device according to any one of the first to fifteenth aspects, the human-powered vehicle is provided with an operation device, and the electronic controller switches the control state according to an operation of the operation device. In accordance with the sixteenth aspect, a user can change the control state to a desired control state with the operation device.

A human-powered vehicle control device used for a human-powered vehicle including an input rotary body to which a human driving force is input, a driving wheel driven by rotating the input rotary body, a transmission for shifting a transmission ratio which is a ratio of a rotational speed of the driving wheel to a rotational speed of the input rotary body, and a motor that assists in propulsion of the human-powered vehicle, a control device for a human-powered vehicle in accordance with a seventeenth aspect includes an electronic controller configured to control the motor and the transmission. The electronic controller is configured to switch a plurality of control states imparting different output characteristics to the motor with respect to the manual human driving force. The plurality of control states include a first predetermined control state and a second predetermined control state. The electronic controller is configured to switch the control state to the second predetermined control state without actuating the transmission upon determining the transmission ratio is a first transmission ratio and a first condition determined in advance is satisfied in the first predetermined control state. The electronic controller is configured to actuate the transmission to switch the transmission ratio from the first transmission ratio to a second transmission ratio upon determining the transmission ratio is a first transmission ratio and the first condition determined in advance is satisfied in the second predetermined control state. In accordance with the seventeenth aspect, if the first condition determined in advance is satisfied, only one of the transmission ratio and the output characteristics of the motor is changed. For this reason, compared with a state where the transmission ratio and the output characteristics of the motor are each changed under different conditions, the transmission ratio and the output characteristics of the motor is appropriately changed.

In accordance with an eighteenth aspect, in the human-powered vehicle control device according to the seventeenth aspect, the first condition determined in advance is satisfied by operating the first operation device. In accordance with the eighteenth aspect, only one of the transmission ratio and the output characteristics of the motor can be changed by operating the first operation device.

In accordance with a nineteenth aspect, in the human-powered vehicle control device according to the seventeenth or eighteenth aspect, the electronic controller is configured to switch the control state to the first predetermined control state without actuating the transmission upon determining the transmission ratio is the second transmission ratio and a second condition differing from the first condition determined in advance is satisfied in the second predetermined control state. Further, the electronic controller is configured to actuate the transmission to switch the transmission ratio from the second transmission ratio to the first transmission ratio upon determining the transmission ratio is a second transmission ratio and the second condition determined in advance is satisfied in the first predetermined control state. In accordance with the nineteenth aspect, if the second condition determined in advance is satisfied, only one of the transmission ratio and the output characteristics of the motor is changed. For this reason, compared with a state where the transmission ratio and the output characteristics of the motor are each changed under different conditions, the transmission ratio and the output characteristics of the motor is appropriately changed.

In accordance with a twentieth aspect, in the human-powered vehicle control device according to the nineteenth aspect, the second condition determined in advance is satisfied by operating a second operation device. In accordance with the twentieth aspect, only one of the transmission ratio and the output characteristics of the motor is changed by operating the second operation device.

In accordance with a twenty-first aspect, in the human-powered vehicle control device according to any one of the seventeenth to twentieth aspects, a ratio of an output of the motor to the human driving force differs between the first predetermined control state and the second predetermined control state. In accordance with the twenty-first aspect, the transmission ratio and the ratio of the output of the motor are appropriately changed.

In accordance with a twenty-second aspect, in the human-powered vehicle control device according to any one of the seventeenth to twenty-first aspects, a maximum output of the motor differs between the first predetermined control state and the second predetermined control state. In accordance with the twenty-second aspect, it is possible to appropriately change the transmission ratio and the maximum output of the motor.

In accordance with a twenty-third aspect, in the human-powered vehicle control device according to any one of the first to twenty-second aspects, the number of the control states is changeable by an external device. In accordance with the twenty-third aspect, the number of the control states can be changed to an appropriate number by the external device. This contributes to usability.

A human-powered vehicle control device for a human-powered vehicle in accordance with a twenty-fourth of the present disclosure includes an electronic controller configured to control a motor that assists in propulsion of the human-powered vehicle in accordance with a human driving force input to the human-powered vehicle. The electronic controller is configured to switch a plurality of control states imparting different output characteristics to the motor with respect to the human driving force. The number of the control states is changeable by an external device. In accordance with the twenty-fourth aspect, the number of the control states can be changed to an appropriate number by the external device. This contributes to usability.

The human-powered vehicle control device for a human-powered vehicle in accordance with the present disclosure contributes to usability.

BRIEF DESCRIPTION OF THE DRAWINGS

Referring now to the attached drawings which form a part of this original disclosure.

DETAILED DESCRIPTION OF EMBODIMENTS

Figure 1:
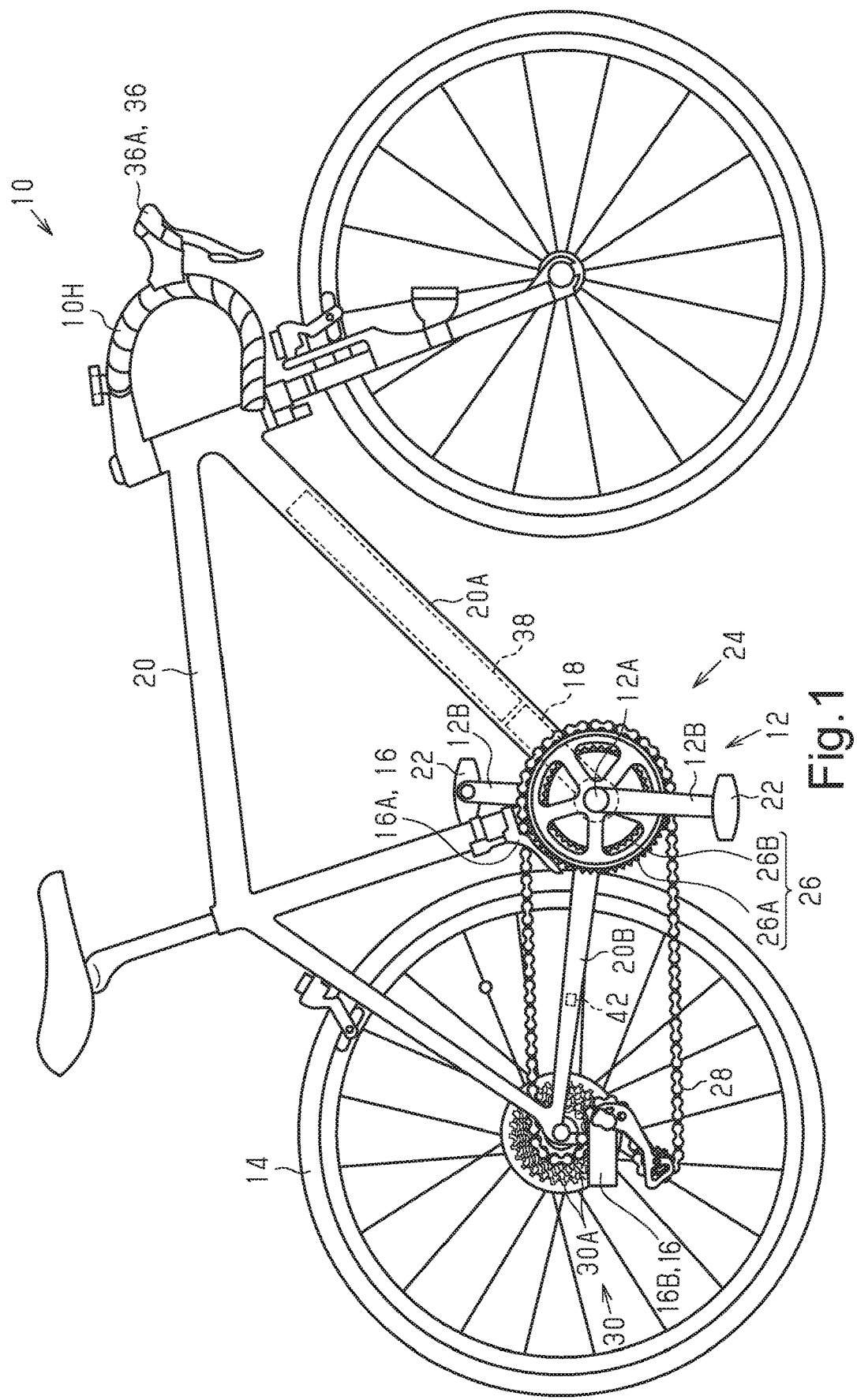
FIG. 1 is a side elevational view of a human-powered vehicle including a control device for a human-powered vehicle in accordance with a first embodiment.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A human-powered vehicle control device 50 for a human-powered vehicle in accordance with one embodiment will now be described with reference to FIG. 1. Hereinafter, the human-powered vehicle control device 50 will be described simply as the control device 50. The control device 50 is provided in a human-powered vehicle 10. The human-powered vehicle 10 is a vehicle that can be driven by at least human driving force. The human-powered vehicle 10 includes, for example, a bicycle. There is no limit to the number of wheels of the human-powered vehicle 10. For example, the human-powered vehicle 10 can be a unicycle or a vehicle having three or more wheels. Examples of a bicycle include a mountain bike, a road bike, a city bike, a cargo bike, and a recumbent bicycle. Hereinafter, in the embodiment, the human-powered vehicle 10 will be referred to as a bicycle.

The human-powered vehicle 10 includes an input rotary body 12, a driving wheel 14, and a motor 18. The human-powered vehicle 10 further includes a transmission 16. The human-powered vehicle 10 further includes a frame 20. A human driving force is input to the input rotary body 12. The input rotary body 12 includes a crank. The input rotary body 12 includes a crankshaft 12A rotatable with respect to the frame 20 and a pair of crank arms 12B provided at both end in an axial direction of the crankshaft 12A, respectively. Each of the crank arms 12B is connected to a pedal 22. The driving wheel 14 is driven by rotating the input rotary body 12. The driving wheel 14 is supported by the frame 20. The input rotary body 12 and the driving wheel 14 are connected to each other by a drive mechanism 24. The drive mechanism 24 includes a first rotary body 26 coupled to the crankshaft 12A. The crankshaft 12A and the first rotary body 26 can be coupled to each other by a first one-way clutch. The first one-way clutch is configured to rotate the first rotary body 26 forward in a state where the input rotary body 12 is rotated forward and is configured so as not to rotate the first rotary body 26 backward in a state where the input rotary body 12 is rotated backward. The first rotary body 26 includes a sprocket, a pulley, or a bevel gear. The drive mechanism 24 further includes a connection member 28 and a second rotary body 30. The connection member 28 transmits a rotating force of the first rotary body 26 to the second rotary body 30. The connection member 28 includes, for example, a chain, a belt, or a shaft.

The second rotary body 30 is connected to the driving wheel 14. The second rotary body 30 includes a sprocket, a pulley, or a bevel gear. It is preferable that a second one-way clutch be provided between the second rotary body 30 and the driving wheel 14. The second one-way clutch is configured to rotate the driving wheel 14 forward in a state where the second rotary body 30 is rotated forward, and is configured so as not to rotate the driving wheel 14 backward in a state where the second rotary body 30 is rotated backward.

The human-powered vehicle 10 includes a front wheel and a rear wheel. The front wheel is attached to the frame 20 by a front fork. A handlebar 10H is connected to the front fork by a stem. In the following embodiments, the rear wheel will be referred to as the driving wheel 14, but the front wheel can be the driving wheel 14.

Figure 2:
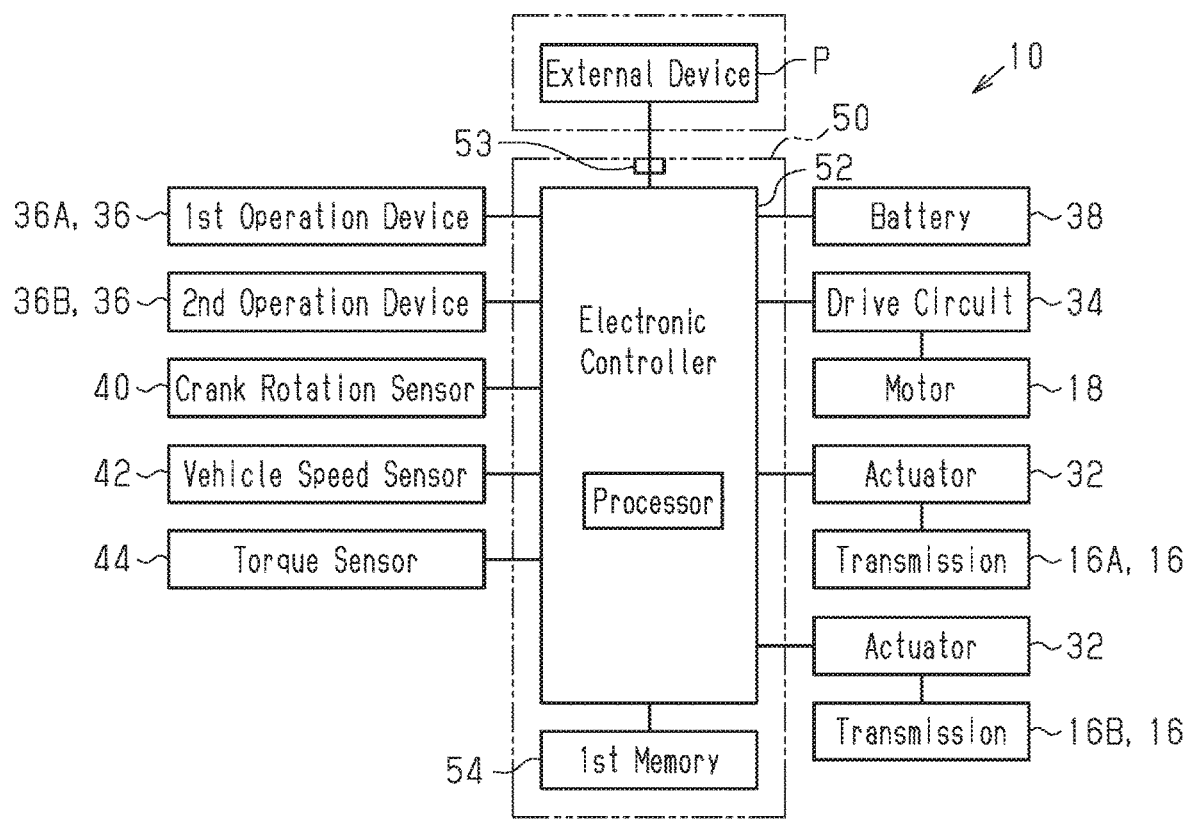
FIG. 2 is a block diagram showing an electrical configuration of the control device for the human-powered vehicle in accordance with the first embodiment.

As shown in FIG. 2, the human-powered vehicle 10 further includes a drive circuit 34 of the motor 18, an actuator 32 of a transmission 16, an operation device 36, a battery 38, a crank rotation sensor 40, a vehicle speed sensor 42, a torque sensor 44, and a control device 50.

The motor 18 and the drive circuit 34 are preferably provided in the same housing. The drive circuit 34 controls electric power supplied from the battery 38 to the motor 18. The drive circuit 34 is connected to an electronic controller 52 of the control device 50 so as to communicate with the electronic controller 52 of the control device 50 through wired connection or wireless connection. The electronic controller 52 will hereafter be referred to simply as the controller 52. The drive circuit 34 can communicate with the controller 52, for example, by serial communication. The drive circuit 34 drives the motor 18 in response to a control signal from the controller 52. The drive circuit 34 can be included in the control device 50 or can be included in the controller 52. The motor 18 assists the propulsion of the human-powered vehicle 10. The motor 18 includes an electric motor. The motor 18 is provided so as to transmit a transmission path of a human driving force from the pedal 22 to the rear wheel or the rotation to the front wheel. The motor 18 is provided on the frame 20, the rear wheel, or the front wheel of the human-powered vehicle 10. In one example, the motor 18 is coupled to a power transmission path from the crankshaft 12A to the first rotary body 26. It is preferable that the power transmission path between the motor 18 and the crankshaft 12A be provided with the one-way clutch so that the motor 18 is not rotated by the rotating force of the input rotary body 12 in a state where the human-powered vehicle 10 rotates the crankshaft 12A in a forward direction. The housing provided with the motor 18 and the drive circuit 34 can be provided with components other than the motor 18 and the drive circuit 34, for example, a reduction gear that reduces the speed of the rotation of the motor 18 and then outputs the rotation.

In the human-powered vehicle 10 shown in FIG. 1, the motor 18 is coupled to the power transmission path from the crankshaft 12A to the first rotary body 26. At least part of the motor 18 can be accommodated in a down tube 20A of the frame 20. It is preferable that the crankshaft 12A be provided in the same housing as the motor 18. A rotation axis of the motor 18 can correspond to an extending direction of the down tube 20A of the frame 20. In this case, a mechanism for converting a rotation direction can be provided between the motor 18 and the power transmission path from the crankshaft 12A to the first rotary body 26.

The transmission 16 is for changing a transmission ratio R which is a ratio of a rotational speed of the driving wheel 14 to a rotational speed of the input rotary body 12. The transmission 16 is configured to change the transmission ratio R of the human-powered vehicle 10. The transmission 16 is configured to be capable of changing the transmission ratio R in a stepped manner. An actuator 32 causes the transmission 16 to perform a shift actuation. The transmission 16 is controlled by the controller 52. The actuator 32 is connected to the controller 52 so as to communicate with the controller 52 through wired connection or wireless connection. The actuator 32 can communicate with the controller 52, for example, by power line communication (PLC). The actuator 32 causes the transmission 16 to perform the shift actuation in response to the control signal from the controller 52. The transmission 16 includes at least one of an internal transmission and an external transmission (derailleur). The transmission 16 can include only the internal transmission, only the external transmission, or both the internal transmission and the external transmission.

In the human-powered vehicle 10 shown in FIG. 1, the transmission 16 includes a front derailleur 16A and a rear derailleur 16B. The first rotary body 26 includes a first sprocket 26A and a second sprocket 26B having a smaller diameter than the first sprocket 26A. The front derailleur 16A is configured to be switchable between a first shift stage using the first sprocket 26A and a second shift stage using the second sprocket 26B. The second rotary body 30 includes a plurality of rear sprockets 30A. The rear derailleur 16B is configured to switch the shift stage by moving the connection member 28 between the rear sprockets 30A. The transmission 16 can include only one of the front derailleur 16A and the rear derailleur 16B.

The operation device 36 is provided in the human-powered vehicle 10. The operation device 36 includes a first operation device 36A and a second operation device 36B. The operation device 36 is configured to be operable by a user. The operation device 36 is configured to change at least one of the transmission ratio R and the control state of the controller 52. The operation device 36 is configured to change only the transmission ratio R, only the control state of the controller 52, or both the transmission ratio R and the control state of the controller 52.

Figure 3:
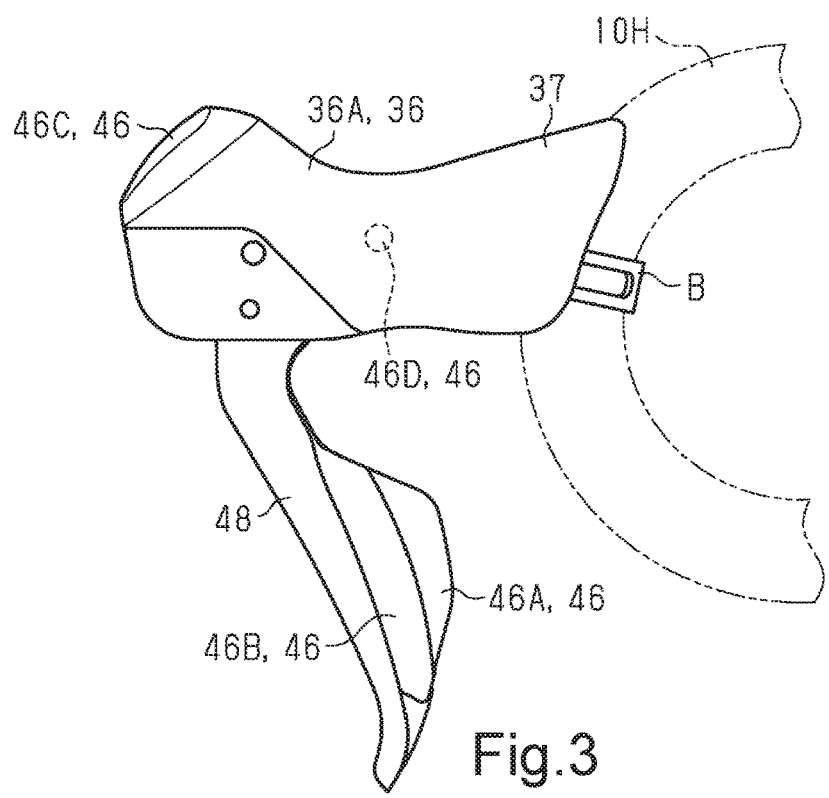
FIG. 3 is a side elevational view of a first operation device as viewed from an outside in a vehicle width direction.
Figure 4:
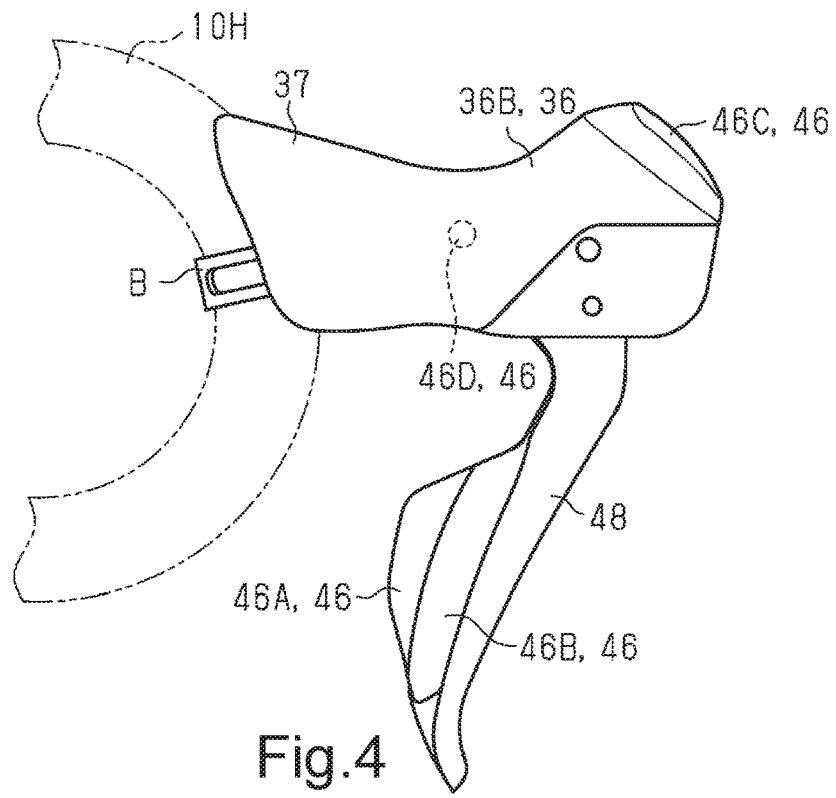
FIG. 4 is a side elevational view of a second operation device as viewed from the outside in the vehicle width direction.

As shown in FIGS. 3 and 4, the operation device 36 is attached to the handlebar 10H of the human-powered vehicle 10. The operation device 36 is connected to the controller 52 so as to communicate with the controller 52 through wired connection or wireless connection. The operation device 36 is configured to communicate with the controller 52, for example, through the PLC. The handlebar 10H is formed by, for example, a drop handlebar. For example, the first operation device 36A is provided at a first end of the handlebar 10H in the vehicle width direction of the human-powered vehicle 10, and the second operation device 36B is provided at a second end of the handlebar 10H. The first end of the handlebar 10H is an end on a left side in a traveling direction of the human-powered vehicle 10. The second end of the handlebar 10H is an end on a right side in the traveling direction of the human-powered vehicle 10. The first operation device 36A and the second operation device 36B each include, for example, an operation member 46, a sensor detecting movement of the operation member 46, and an electric circuit communicating with the controller 52 in response to an output signal of the sensor. The operation member 46 is operated by a user so that the operation device 36 transmits the output signal to the controller 52. The operation member 46 is configured to include a push switch, a lever type switch, or a touch panel. The operation device 36 can include a plurality of operation members 46. In the present embodiment, the operation member 46 includes a first operation member 46A, a second operation member 46B, a third operation member 46C, and a fourth operation member 46D. The first operation device 36A and the second operation device 36B each include a base portion 37 whose one end is attachable to the handlebar 10H. The one end of the base portion 37 is fixed to the handlebar 10H by a fixing band B. The base portion 37 is configured to be held by a rider. The other end of the base portion 37 is provided with a brake lever 48 controlling a brake. The brake lever 48 controlling the brake is attached to the other end portion of the base portion 37 so as to be pivotal to the base portion 37. The brake lever 48 cancan be configured to control a brake device through a Bowden cable or can be configured to control the brake device by a hydraulic pressure through a brake hose. In a state where the brake lever 48 controls the brake device by the hydraulic pressure, it is preferable that the base portion 37 be provided with a hydraulic piston. For example, the brake device of the front wheel is operated by the brake lever 48 of the first operation device 36A and the brake device of the rear wheel is operated by the brake lever 48 of the second operation device 36B.

The first operation member 46A and the second operation member 46B are provided, for example, on the brake lever 48. It is preferable that the first operation member 46A and the second operation member 46B be provided at an end of the brake lever 48 on the side of the handlebar 10H of the brake lever 48. The third operation member 46C is provided, for example, at a second end of the base portion 37. It is preferable that the third operation member 46C be provided, for example, at an upper end of the second end of the base portion 37. The fourth operation member 46D is provided, for example, at an intermediate part between the first end and the second end of the base portion 37. It is preferable that the fourth operation member 46D be provided on a surface side that passes through a center in the vehicle width direction of the human-powered vehicle 10, in the intermediate part between the first end and the second end of the base portion 37.

The output signal transmitted from the operation device 36 to the controller 52 differs for each operation member 46. The output signal transmitted to the controller 52 in a state where each of the first operation member 46A, the second operation member 46B, the third operation member 46C, and the fourth operation member 46D of the first operation device 36A is operated is different from the output signal transmitted to the controller 52 in a state where each of the first operation member 46A, the second operation member 46B, the third operation member 46C, and the fourth operation member 46D of the second operation device 36B is operated.

The first memory device 54 stores information on a combination of each operation member 46 and the control operation in a state where each operation member 46 is operated. More specifically, in a state where each operation member 46 is operated, the first memory device 54 stores information on the output signal transmitted from the operation device 36 and the information on the combination with the control operation in a state where the output signal is received.

Table 1 shows the control operation of the controller 52 stored in the first memory device 54. The ratio corresponds to a ratio A of the output of the motor 18 to human driving force TA input to the human-powered vehicle 10 to be described later.

TABLE 1

| | Control operation |
|---|---|
| 1 | Shift up of front derailleur |
| 2 | Shift down of front derailleur |
| 3 | Shift up of rear derailleur |
| 4 | Shift down of rear derailleur |
| 5 | Change control state so that ratio is increased |
| 6 | Change control state so that ratio is decreased |

Table 2 shows an example of the information on the combination stored in the first memory device 54. The first memory device 54 can store combinations of each of the operation members 46A to 46D and numbers stored corresponding to the control operation of the above Table 1.

TABLE 2

| Operation member | Control operation |
|---|---|
| First operation member of first operation device | Shift up of rear derailleur |
| Second operation member of first operation device | Shift down of rear derailleur |
| Third operation member of first operation device | Change control state so that ratio is decreased |
| Fourth operation member of first operation device | Change control state so that ratio is decreased |
| First operation member of second operation device | Shift down of front derailleur |
| Second operation member of second operation device | Shift up of front derailleur |
| Third operation member of second operation device | Change control state so that ratio is increased |
| Fourth operation member of second operation device | Change control state so that ratio is increased |

The information on the combination of each operation member 46 and the control operation in a state where each operation member 46 is operated is changeable by an external device P. For example, in the example of the above Table 2, if the third operation member 46C of the first operation device 36A is operated, the controller 52 changes the control state so that the ratio A is decreased, but if the third operation member 46C of the first operation device 36A is operated, the controller 52 can change the control state so that the ratio A is increased. In a state where the first memory device 54 stores the combination of each of the operation members 46A to 46D and the numbers stored corresponding to the control operation of the above Table 1, the first memory device 54 can change the information on the combination by changing the numbers corresponding to each of the operation members 46A to 46D.

In the first operation device 36A, at least one of the first operation member 46A, the second operation member 46B, the third operation member 46C, and the fourth operation member 46D can be omitted. In the second operation device 36B, at least one of the first operation member 46A, the second operation member 46B, the third operation member 46C, and the fourth operation member 46D of the second operation device 36B can be omitted. In the first operation device 36A, only the first operation member 46A, only the second operation member 46B, only the third operation member 46C, only the fourth operation member 46D, or any combination of the first operation member 46A, the second operation member 46B, the third operation member 46C, and the fourth operation member 46D can be omitted. In the second operation device 36B, only the first operation member 46A, only the second operation member 46B, only the third operation member 46C, only the fourth operation member 46D, or any combination of the first operation member 46A, the second operation member 46B, the third operation member 46C, and the fourth operation member 46D can be omitted. For example, in a state where the front derailleur 16A is omitted and each of the third operation member 46C and the fourth operation member 46D of the first operation device 36A and the second operation device 36B is omitted, the information on the combination can be set as shown in Table 3. Table 3 shows another example of the information stored in the first memory device 54.

TABLE 3

| Operation member | Control operation |
|---|---|
| First operation member of first operation device | Shift up of rear derailleur |

TABLE 3-continued

| Operation member | Control operation |
|---|---|
| Second operation member of first operation device | Shift down of rear derailleur |
| First operation member of second operation device | Change control state so that ratio is increased |
| Second operation member of second operation device | Change control state so that ratio is decreased |

For example, in a state where the front derailleur 16A is omitted and each of the first operation member 46A and the fourth operation member 46D of the first operation device 36A and the second operation device 36B is omitted, the information on the combination can be set as shown in Table 4. Table 4 shows another example of the information stored in the first memory device 54.

TABLE 4

| Operation member | Control operation |
|---|---|
| Second operation member of first operation device | Shift down of rear derailleur |
| Third operation member of first operation device | Change control state so that ratio is decreased |
| Second operation member of second operation device | Shift up of rear derailleur |
| Third operation member of second operation device | Change control state so that ratio is increased |

If the operation member 46 of the operation device 36 is operated, only the control state of the controller 52 related to the motor 18 can be changed. In a state where the control state is changed so that the ratio A is increased, if the operation member 46 is operated once, the controller 52 changes the control state so that the ratio A is increased by one step. In a state where the control state is changed so that the ratio A is decreased, if the operation member 46 is operated once, the controller 52 changes the control state so that the ratio A is decreased by one step.

The controller 52 can change the control state in a stepped manner in correspondence with an operating time of the operation member 46. For example, the controller 52 is configured to change the control state in a state where the operation member 46 is operated, and change the control state in a stepped manner whenever the state where the operation member 46 is operated elapses a predetermined time. In the case of the above Table 1, the controller 52 changes the control state so that the ratio A is decreased by one step in a state where the third operation member 46C of the first operation device is operated, and changes the control state so that the ratio A is further decreased by one step if a predetermined time elapses from a time when the third operation member 46C of the first operation device is operated. The predetermined time is, for example, a time in the range of 0.3 seconds or more and less than 2 seconds. In this manner, if the operation member 46 is continuously operated, the control state of the controller 52 can be changed in a stepped manner. This further improves the convenience.

The battery 38 shown in FIG. 2 includes one or a plurality of battery cells. The battery cell includes a rechargeable battery. The battery 38 is provided in the human-powered vehicle 10 and supplies electric power to other electrical components, such as the motor 18, the actuator 32, and the control device 50, which are electrically connected to the battery 38 in a wired manner. The battery 38 is connected to the controller 52 so as to communicate with the controller 52 through wired connection or wireless connection. The battery 38 is configured to communicate with the controller 52, for example, by the PLC. The battery 38 can be attached to the outside of the frame 20 or at least partially accommodated inside the frame 20.

In the human-powered vehicle 10 shown in FIG. 1, the battery 38 is accommodated inside the frame 20. In this case, the battery 38 can be accommodated in the down tube 20A of the frame 20. In a state where the motor 18 and the battery 38 are accommodated in the frame 20, terminals capable of being electrically connected with each other can be provided in the housing provided with the motor 18 and the battery 38, respectively.

The crank rotation sensor 40 shown in FIG. 2 detects the rotational speed of the input rotary body 12. The crank rotation sensor 40 is attached to the housing provided with the frame 20 or the motor 18 of the human-powered vehicle 10. The crank rotation sensor 40 includes a magnetic sensor outputting a signal corresponding to the intensity of a magnetic field. An annular magnet whose strength of the magnetic field is changed in a circumferential direction is provided on the power transmission path between the crankshaft 12A or the crankshaft 12A and the first rotary body 26. The crank rotation sensor 40 is connected to the controller 52 so as to communicate with the controller 52 through wired connection or wireless connection. The crank rotation sensor 40 outputs the signal corresponding to the rotational speed of the input rotary body 12 to the controller 52.

The crank rotation sensor 40 can be provided on a member that is integrally rotated with the crankshaft 12A in the transmission path of the human driving force from the crankshaft 12A to the first rotary body 26. For example, the crank rotation sensor 40 can be provided on the first rotary body 26 in a state where the one-way clutch is not provided between the crankshaft 12A and the first rotary body 26.

The vehicle speed sensor 42 detects the rotational speed of the wheel. The vehicle speed sensor 42 is electrically connected to the controller 52 through wired connection or wireless connection. The vehicle speed sensor 42 is connected to the controller 52 so as to communicate with the controller 52 through wired connection or wireless connection. The vehicle speed sensor 42 outputs the signal corresponding to the rotational speed of the wheel to the controller 52. The controller 52 calculates a vehicle speed V of the human-powered vehicle 10 based on the rotational speed of the wheel. The controller 52 stops the motor 18 if the vehicle speed V is larger than or equal to the predetermined value. The predetermined value is, for example, 25 kilometers per hour or 45 kilometers per hour. It is preferable that the vehicle speed sensor 42 include a magnetic lead constituting a reed switch or a Hall element. The vehicle speed sensor 42 can be configured to be attached to a chain stay 20B of the frame 20 so as to detect a magnet attached to the rear wheel, or can be configured to be provided on the front fork so as to detect a magnet attached to the front wheel.

The torque sensor 44 is provided in the housing provided with the motor 18. The torque sensor 44 detects the human driving force TA input to the input rotary body 12. The torque sensor 44 is provided, for example, above a first one-way clutch in the power transmission path. The torque sensor 44 includes a strain sensor, a magnetostrictive sensor, or the like. The strain sensor includes a strain gauge. In a state where the torque sensor 44 includes the strain sensor, the strain sensor is provided on the outer circumference of the rotary body included in the power transmission path. The torque sensor 44 can include a unit that performs communication through wireless connection or wired connection. The communication unit of the torque sensor 44 is configured to communicate with the controller 52.

The control device 50 includes the controller 52. In one example, the control device 50 further includes the first memory device 54. The controller 52 includes an arithmetic processing unit that executes predetermined control programs. The arithmetic processing unit includes, for example, a central processing unit (CPU) or a micro processing unit (MPU) that includes one or more processors. The controller 52 can include one or a plurality of microcomputers. The controller 52 can be formed of one or more semiconductor chips that are mounted on a printed circuit board. The term "electronic controller" or "controller" as used herein refers to hardware that executes a software program. The first memory device 54 stores various control programs and information used for various control processes. The first memory device 54 is any computer storage device or any computer readable medium with the sole exception of a transitory, propagating signal. The first memory device 54 includes, for example, a non-volatile memory device and a volatile memory device. The controller 52 and the first memory device 54 are provided, for example, in the housing provided with the motor 18.

The controller 52 is operatively coupled to the motor 18, and is configured to control the motor 18 and the transmission 16. The controller 52 controls the motor 18 according to the human driving force TA input to the human-powered vehicle 10. The controller 52 can include control circuits at positions separated from each other. For example, one of the control circuits in the controller 52 can be provided in the housing provided with the motor 18, and another one of the control circuits of the controller 52 can be provided in the transmission 16 or the operation device 36. The controller 52 is configured to switch the plurality of control states imparting different output characteristics to the motor 18 with respect to the human driving force TA.

The controller 52 is configured to switch at least three control states imparting different output characteristics to the motor 18 with respect to the human driving force TA. The controller 52 controls the motor 18 so that a drive ratio A of the output of the motor 18 to the human driving force TA input to the human-powered vehicle 10 is different in each of at least three control states. The ratio of the torque of the output of the motor 18 to the torque of the human driving force TA input to the human-powered vehicle 10 can be referred to as the drive ratio A. The ratio of the power (watt) of the output of the motor 18 to the power (watt) of the human driving force input to the human-powered vehicle 10 can be referred to as the drive ratio A. The power of the human driving force is calculated by multiplying the human driving force TA by the crank rotational speed. In a state where the output of the motor 18 is input to a manual driving path by the reduction gear, the output of the reduction gear is set as the output of the motor 18. The at least three control states include a first control state where the drive ratio A is the first ratio A1, a second control state where the drive ratio A is the second ratio A2 larger than the first ratio A1, and a third control state where the drive ratio A is the third ratio A3 larger than the second ratio A2. The at least three control states further include a fourth control state where the drive ratio A is the fourth ratio A4 larger than the third ratio A3. The first memory device 54 changeably stores the ratios A corresponding to each of the at least three control states.

The difference between the first ratio A1 and the second ratio A2 and the difference between the second ratio A2 and the third ratio A3 are each smaller than or equal to 30%. Preferably, at least one of the difference between the first ratio A1 and the second ratio A2 and the difference between the second ratio A2 and the third ratio A3 is less than 10%. Only the difference between the first ratio A1 and the second ratio A2 can be less than 10%. Only the difference between the second ratio A2 and the third ratio A3 can be less than 10%. Both the difference between the first ratio A1 and the second ratio A2 and the difference between the second ratio A2 and the third ratio A3 can be less than 10%. More preferably, the difference between the first ratio A1 and the second ratio A2 and the difference between the second ratio A2 and the third ratio A3 are each less than 10%. The difference between the fourth ratio A4 and the third ratio A3 is larger than 30% and smaller than or equal to 300%.

In one example, the controller 52 is configured to switch at least five control states imparting different output characteristics to the motor 18 with respect to the human driving force TA. The drive ratio A of the output of the motor 18 to the human driving force TA differs in at least five control states. The controller 52 controls the motor 18 so that the drive ratio A is smaller than or equal to 300% in five or more control states out of the at least five control states. The first memory device 54 changeably stores the drive ratio A for each of the at least five control states.

Table 5 shows an example of the relationship between the plurality of control states stored in the first memory device 54 and the ratios A corresponding to each of the plurality of control states. The control states include an off mode, a first mode, a second mode, a third mode, a fourth mode, and a fifth mode. In the combination of the first mode, the second mode, and the third mode, the first mode corresponds to the first control state, the second mode corresponds to the second control state, and the third mode corresponds to the third control state. In the combination of the second mode, the third mode, and the fourth mode, the second mode corresponds to the first control state, the third mode corresponds to the second control state, and the fourth mode corresponds to the third control state. In the combination of the second mode, the third mode, and the fourth mode, the fifth mode corresponds to the fourth control state. In a case of Table 5, one of the difference between the drive ratio A of the first mode and the drive ratio A of the second mode and the difference between the drive ratio A of the third mode and the drive ratio A of the fourth mode can also be larger than 30%. The plurality of control states can further include the control state where the drive ratio A is larger than the drive ratio A of the fifth mode.

TABLE 5

|  | Drive Ratio A |
| --- | --- |
| Off mode | 0% |
| First mode | 50% |
| Second mode | 55% |
| Third mode | 60% |
| Fourth mode | 65% |
| Fifth mode | 300% |

The drive ratio A stored in the first memory device 54 is changeable by the external device P. The external device P is connected the controller 52 so as to communicate with the controller 52. The external device P includes portable information devices such as a personal computer, a tablet type computer, a cycle computer, and a smartphone. The control device 50 includes an interface portion 53. The interface portion 53 includes at least one of a wired communication unit for connecting an electric cable connected to the external device P and a wireless communication unit for communicating with the external device P through wireless connection. The interface portion 53 can include only the wired communication unit, only the wireless communication unit, or both the wired communication unit and the wireless communication unit. The controller 52 is electrically connected to the interface portion 53 and configured to change the information stored in the memory device 54 in response to an input signal from the external device P received via the interface portion 53. For example, in a state where corresponding information in which the control state and the drive ratio A as shown in the above Table 5 are associated with each other is stored in the first memory device 54, the controller 52 can change the drive ratio A included in the corresponding information by operating the external device P connected to the controller 52. The number of control states is changeable by the external device P. For example, in a state where the corresponding information as shown in the above Table 5 is stored in the first memory device 54, the corresponding information stored in the first memory device 54 is changed to corresponding information larger than or smaller than the number of control states included by operating the external device P connected to the controller 52 so as to communicate with the controller 52, and thus the number of control states is changed.

In a case where the control state is changed so that the drive ratio A is decreased, the controller 52 is changed from the first mode to the off mode if the operation member 46 is operated once. In a case where the control state is changed so that the drive ratio A is increased, the controller 52 is changed from the off mode to the first mode if the operation member 46 is operated once.

Second Embodiment

A control device 50 in accordance with a second embodiment will be described. Since the control device 50 in accordance with the second embodiment is the same as the control device 50 in accordance with the first embodiment except that contents of a control state of a controller 52 related to a motor 18 are different from the first embodiment, components common to the first embodiment are denoted by the same reference numerals as those of the first embodiment and redundant descriptions thereof will be omitted.

Table 6 shows a control operation of the controller 52 stored in a first memory device 54.

TABLE 6

| | Control operation |
| --- | --- |
| 1 | Shift up of front derailleur |
| 2 | Shift down of front derailleur |
| 3 | Shift up of rear derailleur |
| 4 | Shift down of rear derailleur |
| 5 | Change control state so that maximum output of motor is increased |
| 6 | Change control state so that maximum output of motor is decreased |

Table 7 shows an example of information on a combination stored in the first memory device 54.

TABLE 7

| Operation member | Control operation |
| --- | --- |
| First operation member of first operation device | Shift up of rear derailleur |
| Second operation member of first operation device | Shift down of rear derailleur |
| Third operation member of first operation device | Change control state so that maximum output of motor is decreased |

TABLE 7-continued

| Operation member | Control operation |
| --- | --- |
| Fourth operation member of first operation device | Change control state so that maximum output of motor is decreased |
| First operation member of second operation device | Shift down of front derailleur |
| Second operation member of second operation device | Shift up of front derailleur |
| Third operation member of second operation device | Change control state so that maximum output of motor is increased |
| Fourth operation member of second operation device | Change control state so that maximum output of motor is increased |

The information on the combination of each operation member 46 and the control operation in a state where each operation member 46 is operated is changeable by an external device P. For example, in the example of the above Table 7, if a third operation member 46C of a first operation device is operated, the controller 52 changes the control state so that a maximum output TM of a motor 18 is decreased. However, if the third operation member 46C of the first operation device is operated, the controller 52 can change the control state so that the maximum output TM of the motor 18 is increased.

In the first operation device 36A and the second operation device 36B, at least one of a first operation member 46A, a second operation member 46B, a third operation member 46C, and a fourth operation member 46D can be omitted. For example, in a state where a front derailleur 16A is omitted and each of the third operation member 46C and the fourth operation member 46D is omitted from the first operation device 36A and the second operation device 36B, the information on the combination can be set as shown in Table 8. Table 8 shows another example of the information stored in the first memory device 54.

TABLE 8

| Operation member | Control operation |
| --- | --- |
| First operation member of first operation device | Change control state so that ratio is increased |
| Second operation member of first operation device | Change control state so that ratio is decreased |
| First operation member of second operation device | Shift up of rear derailleur |
| Second operation member of second operation device | Shift down of rear derailleur |

For example, in a state where the front derailleur 16A is omitted and each of the first operation member 46A and the fourth operation member 46D is omitted from the first operation device 36A and the second operation device 36B, the information on the combination can be set as shown in Table 9. Table 9 shows another example of the information stored in the first memory device 54.

TABLE 9

| Operation member | Control operation |
| --- | --- |
| Second operation member of first operation device | Shift down of rear derailleur |
| Third operation member of first operation device | Change control state so that ratio is decreased |
| Second operation member of second operation device | Shift up of rear derailleur |
| Third operation member of second operation device | Change control state so that ratio is increased |

If the operation member 46 of the operation device 36 is operated, only the control state of the controller 52 related to the motor 18 can be changed. In a state where the control state is changed so that the maximum output TM of the motor 18 is increased, if the operation member 46 is operated once, the controller 52 changes the control state so that the maximum output TM of the motor 18 is increased by one step. In a state where the control state is changed so that the maximum output TM of the motor 18 is decreased, if the operation member 46 is operated once, the controller 52 changes the control state so that the maximum output TM of the motor 18 is decreased by one step.

The controller 52 can change the control state in a stepped manner in correspondence with an operating time of the operation member 46. For example, the controller 52 is configured to change the control state in a state where the operation member 46 is operated, and change the control state in a stepped manner whenever a predetermined time elapses in a state where the operation member 46 is being operated. In the case of the above Table 7, the controller 52 changes the control state so that the maximum output TM of the motor 18 is decreased by one step in a state where the third operation member 46C of the first operation device 36A is operated, and changes the control state so that the maximum output TM of the motor 18 is further decreased by one step if a predetermined time elapses from a time when the third operation member 46C of the first operation device 36A is operated. The predetermined time is, for example, a time in the range of longer than or equal to 0.3 seconds and shorter than 2 seconds. In this manner, if the operation member 46 is continuously operated, the control state of the controller 52 can be changed in a stepped manner. This further improves the convenience.

Figure 5:
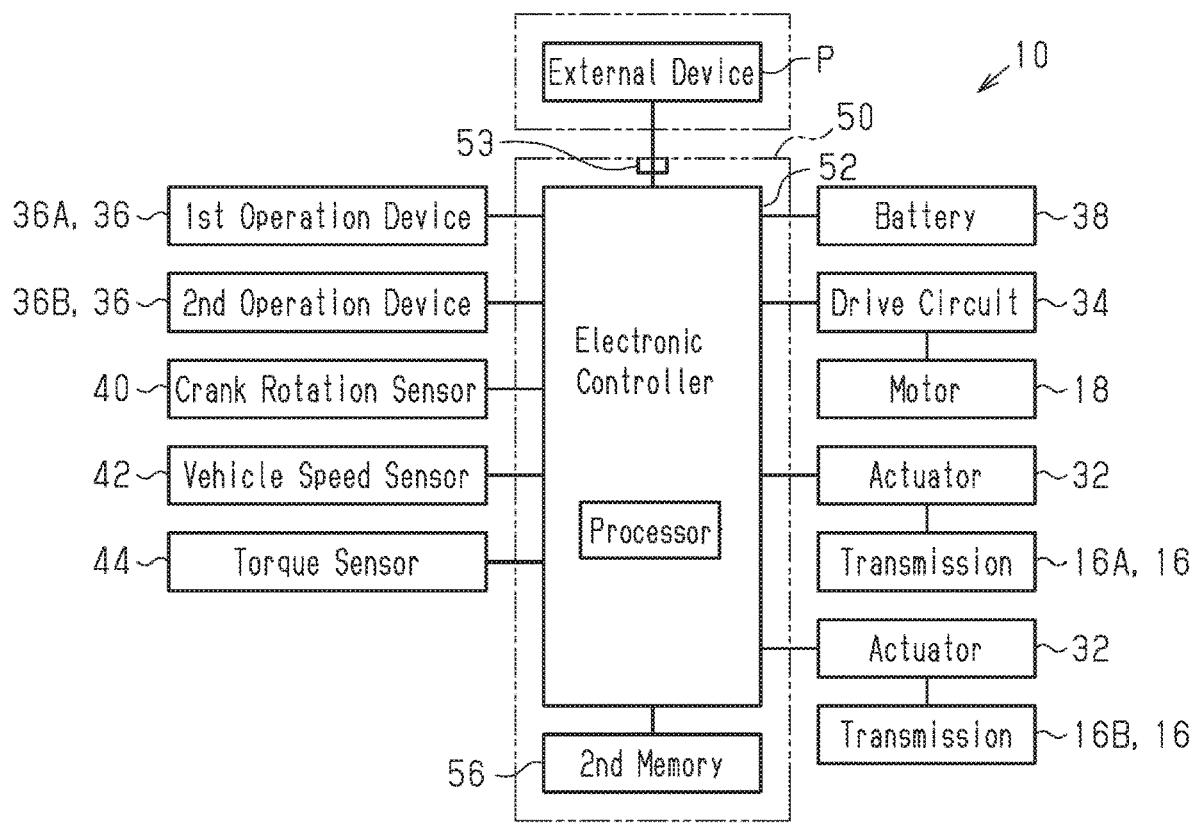
FIG. 5 is a block diagram showing an electrical configuration of a control device for a human-powered vehicle in accordance with a second embodiment.

FIG. 5 shows an example of the control device 50 that differs from FIG. 4. The control device 50 shown in FIG. 5 includes a second memory device 56. The second memory device 56 is any computer storage device or any computer readable medium with the sole exception of a transitory, propagating signal. The second memory device 56 includes, for example, a nonvolatile memory and a volatile memory. The maximum outputs TM of the motor 18 respectively corresponding to the control states are stored in the second memory device 56.

The controller 52 is configured to switch at least three control states imparting different output characteristics to the motor 18 with respect to human driving force TA. The controller 52 controls the motor 18 so that the maximum output TM of the motor 18 is different in each of at least three control states. In a state where the output of the motor 18 is input to a manual driving path by a reduction gear, a maximum output of the reduction gear is set as the maximum output of the motor 18. At least three control states include a first control state where the maximum output TM of the motor 18 is a first predetermined value TM1, a second control state where the maximum output TM of the motor 18 is a second predetermined value TM2 larger than the first predetermined value TM1, and a third control state where the maximum output TM of the motor 18 is a third predetermined value TM3 larger than the second predetermined value TM2. The at least three control states further include a fourth control state where the maximum output TM of the motor 18 is a fourth predetermined value TM4 larger than the third predetermined value TM3. The second memory device 56 changeably stores the maximum outputs TM of the motor 18 corresponding to each of the at least three control states.

The difference between the first predetermined value TM1 and the second predetermined value TM2 and the difference between the second predetermined value TM2 and the third predetermined value TM3 are each smaller than or equal to 30 watts. At least one of the difference between the first predetermined value TM1 and the second predetermined value TM2 and the difference between the second predetermined value TM2 and the third predetermined value TM3 is smaller than or equal to 20 watts. Only the difference between the first predetermined value TM1 and the second predetermined value TM2 can be smaller than or equal to 20 watts. Only the difference between the second predetermined value TM2 and the third predetermined value TM3 is smaller than or equal to 20 watts. Both the difference between the first predetermined value TM1 and the second predetermined value TM2 and the difference between the second predetermined value TM2 and the third predetermined value TM3 can be smaller than or equal to 20 watts. Preferably, the difference between the first predetermined value TM1 and the second predetermined value TM2 and the difference between the second predetermined value TM2 and the third predetermined value TM3 are each smaller than or equal to 20 watts. The difference between the third predetermined value and the fourth predetermined value is larger than 30 watts and smaller than or equal to 200 watts.

In one example, the controller 52 is configured to switch at least five control states imparting different output characteristics to the motor 18 with respect to the human driving force TA. In the at least five control states, the maximum output TM of the motor 18 is different. The controller 52 controls the motor 18 so that the maximum output of the motor 18 is smaller than or equal to 500 watts in five or more control states out of the at least five control states. The controller 52 controls the motor 18 so that the maximum output of the motor 18 is smaller than or equal to 200 watts in five or more control states. The second memory device 56 changeably stores the maximum outputs TM of the motor 18 corresponding to each of the at least five control states.

Table 10 shows an example of the relationship between the plurality of control states stored in the second memory device 56 and the maximum outputs TM of the motor 18 corresponding to each of the plurality of control states. The control states include an off mode, a first mode, a second mode, a third mode, a fourth mode, and a fifth mode. In the combination of the first mode, the second mode, and the third mode, the first mode corresponds to the first control state, the second mode corresponds to the second control state, and the third mode corresponds to the third control state. In the combination of the second mode, the third mode, and the fourth mode, the second mode corresponds to the first control state, the third mode corresponds to the second control state, and the fourth mode corresponds to the third control state. In the combination of the second mode, the third mode, and the fourth mode, the fifth mode corresponds to the fourth control state. In the case of Table 10, one of the difference between the maximum output TM of the motor 18 of the first mode and the maximum output TM of the motor 18 of the second mode and the difference between the maximum output TM of the motor 18 of the third mode and the maximum output TM of the motor 18 of the fourth mode can be larger than 30 watts. The plurality of control states can further include the control state where the maximum output TM is larger than the maximum output TM of the motor 18 of the fifth mode.

TABLE 10

| | Maximum output TM |
|---|---|
| Off mode | 0 watts |
| First mode | 70 watts |
| Second mode | 90 watts |
| Third mode | 110 watts |
| Fourth mode | 130 watts |
| Fifth mode | 330 watts |

The maximum output TM of the motor 18 stored in the second memory device 56 is changeable by the external device P. For example, in a state where corresponding information in which the control state and the maximum output TM of the motor 18 as shown in the above Table 10 are associated with each other is stored in the second memory device 56, the controller 52 can change the maximum output TM of the motor 18 included in the corresponding information by operating the external device P connected to the controller 52. The number of control states is changeable by the external device P. For example, in a state where the corresponding information as shown in the above Table 10 is stored in the second memory device 56, the corresponding information stored in the second memory device 56 is changed to corresponding information larger than or smaller than the number of control states included by operating the external device P connected to the controller 52. This changes the number of control states.

In a case of changing the control state so that the maximum output TM of the motor 18 is decreased, the controller 52 can also be changed from the first mode to the off mode upon determining the operation member 46 has been operated once. In a case of changing the control state so that the maximum output TM of the motor 18 is decreased, the controller 52 can also be changed from the off mode to the first mode upon determining the operation member 46 has been operated once. The controller 52 can be configured to be shifted to the off mode by operating one of the operation members 46 or another operation device that differs from the operation device 36.

Third Embodiment

Figure 6:
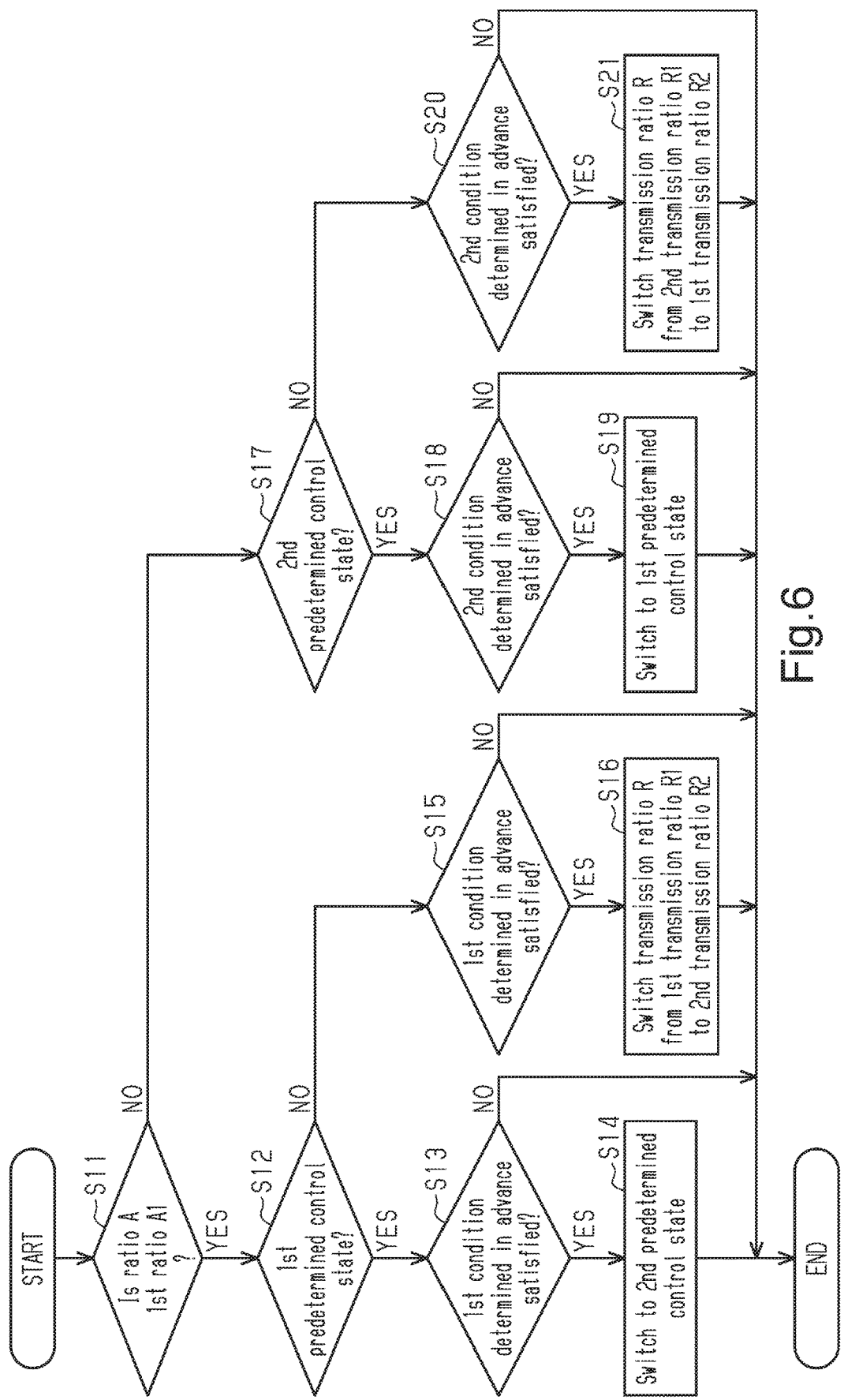
FIG. 6 is a flowchart of a process of switching a transmission ratio and a control state of a motor executed by an electronic controller in accordance with the second embodiment.

A control device 50 in accordance with a third embodiment will be described with reference to FIG. 6. Since the control device 50 in accordance with the third embodiment is the same as the control device 50 in accordance with the first embodiment except that a control state of a controller 52 related to a motor 18 is different from the first embodiment, components common to the first embodiment are denoted by the same reference numerals as those of the first embodiment. Such components will not be described in detail.

The controller 52 is configured to switch a plurality of control states imparting different output characteristics to the motor 18 with respect to human driving force TA. The control states include a first predetermined control state and a second predetermined control state. In the first predetermined control state and the second predetermined control state, a drive ratio A of an output of the motor 18 to human driving force TA is different. One of the first predetermined control state and the second predetermined control state can be in a control state where a drive ratio A is 0% and the other thereof can be in a control state where the drive ratio A is larger than 0%. The first predetermined control state corresponds to, for example, an off mode and any one of first to fifth modes of Table 10. The second predetermined control state corresponds to, for example, a mode different from the first predetermined control state among the off mode and the first to fifth modes of Table 10. The controller 52 switches the control state according to the operation of the operation device 36.

Upon determining a transmission ratio R is a first transmission ratio R1 and a first condition determined in advance is satisfied in the first predetermined control state, the controller 52 switches the control state to the second predetermined control state without actuating a transmission 16. Upon determining the transmission ratio R is the first transmission ratio R1 and the first condition determined in advance is satisfied in the second predetermined control state, the controller 52 actuates the transmission 16 to switch the transmission ratio R from the first transmission ratio R1 to a second transmission ratio R2. The first condition determined in advance is satisfied by operating a first operation device 36A. The first condition determined in advance is satisfied, for example, by operating a first operation member 46A of the first operation device 36A.

Upon determining the transmission ratio R is the second transmission ratio R2 and a second condition different from the first condition determined in advance is satisfied in the second predetermined control state, the controller 52 switches the control state to the first predetermined control state without actuating the transmission 16. Upon determining the transmission ratio R is the second transmission ratio R2 and the second condition determined in advance is satisfied in the first predetermined control state, the controller 52 actuates the transmission 16 to switch the transmission ratio R from the second transmission ratio R2 to the first transmission ratio R1. The second condition determined in advance is satisfied by operating a second operation device 36B. The second condition determined in advance is satisfied, for example, by operating the first operation member 46A of the second operation device 36B.

The first condition and the second condition that are determined in advance can be satisfied according to at least one of a traveling state and a traveling environment of the human-powered vehicle 10. The first condition and the second condition that are determined in advance can be satisfied according to only the traveling state of the human-powered vehicle 10, only the traveling environment of the human-powered vehicle 10, or both of traveling state and the traveling environment of the human-powered vehicle 10. In this case, it is preferable that the first condition and the second condition that are determined in advance be opposite conditions. For example, the first condition determined in advance can also be satisfied according to a traveling load of the human-powered vehicle 10. The second condition determined in advance can also be satisfied according to the traveling load of the human-powered vehicle 10. Specifically, in a state where the traveling load of the human-powered vehicle 10 is increased, the controller 52 determines that the first condition determined in advance is satisfied, and in a state where the traveling load of the human-powered vehicle 10 is decreased, the controller 52 determines that the second condition determined in advance is satisfied. Alternatively, in a state where the traveling load of the human-powered vehicle 10 is decreased, the controller 52 determines that the first condition determined in advance is satisfied. In a state where the traveling load of the human-powered vehicle 10 is decreased, the controller 52 determines that the second condition determined in advance is satisfied.

In a state where one of the first condition and the second condition that are determined in advance is satisfied, the controller 52 switches the transmission ratio R or the control state to be able to switch the transmission ratio R or the control state so that the traveling load of the human-powered vehicle 10 is decreased. Specifically, in a state where the transmission ratio R is switched, the switching to decrease the transmission ratio R is performed, and in a state where the control state is switched, the switching to increase the drive ratio A is performed. For example, in a state where the first transmission ratio R1 is a transmission ratio R corresponding to a first shift stage and the second transmission ratio R2 is a transmission ratio R corresponding to a second shift stage, the switching from the second shift stage to the first shift stage is performed to perform the switching to decrease the transmission ratio R.

In a state where the other of the first condition and the second condition that are determined in advance is satisfied, it is preferable that the controller 52 switch the transmission ratio R or the control state to switch the transmission ratio R or the control state so that the traveling load of the human-powered vehicle 10 is increased. Specifically, in a state where the transmission ratio R is switched, the switching to increase the transmission ratio R is performed, and in a state where the control state is switched, the switching to decrease the drive ratio A is performed. For example, in a state where the first transmission ratio R1 is the transmission ratio R corresponding to the first shift stage and the second transmission ratio R2 is the transmission ratio R corresponding to the second shift stage, the switching from the first shift stage to the second shift stage is performed to perform the switching to decrease the transmission ratio R.

A process of changing the control state and the transmission ratio R will now be described with reference to FIG. 6. If electric power is supplied from a battery 38 to the controller 52, then the controller 52 starts the processing and the processing proceeds to step S11 of the flowchart shown in FIG. 6. As long as electric power is supplied, the controller 52 executes processing from step S11 in each predetermined cycle. FIG. 6 shows processing in a state where the drive ratio A includes only a first ratio A1 and a second ratio A2, and the transmission ratio R includes only the first transmission ratio R1 and the second transmission ratio R2.

In step S11, the controller 52 determines whether the drive ratio A is the first ratio A1. In a state where the controller 52 determines that the drive ratio A is the first ratio A1, the processing proceeds to step S12. In step S12, the controller 52 determines whether the control state is in the first predetermined control state. In a state where the controller 52 determines that the control state is in the first predetermined control state, the processing proceeds to step S13. In step S13, the controller 52 determines whether the first condition determined in advance is satisfied. In a state where the controller 52 determines that the first condition determined in advance is satisfied, the processing proceeds to step S14. In step S14, the controller 52 performs the switching to the second predetermined control state and the processing ends. In a state where the controller 52 determines in step S13 that the first condition determined in advance is not satisfied, the processing ends.

In a state where the controller 52 determines in step S12 that the control state is not in the first predetermined control state, the processing proceeds to step S15. In step S15, the controller 52 determines whether the first condition determined in advance is satisfied. In a state where the controller 52 determines that the first condition determined in advance is satisfied, the processing proceeds to step S16. In step S16, the controller 52 switches the transmission ratio R from the first transmission ratio R1 to the second transmission ratio R2 and the processing ends. In a state where the controller 52 determines in step S15 that the first condition determined in advance is not satisfied, the processing ends.

In a state where the controller 52 determines in step S11 that the drive ratio A is the second ratio A2, the processing proceeds to step S17. In step S17, the controller 52 determines whether the control state is in the second predetermined control state. In a state where the controller 52 determines that the control state is in the second predetermined control state, the processing proceeds to step S18. In step S18, the controller 52 determines whether the second condition determined in advance is satisfied. In a state where the controller 52 determines that the second condition determined in advance is satisfied, the controller 52 performs the switching to the first predetermined control state in step S19, and the processing ends. In a state where the controller 52 determines in step S19 that the second condition determined in advance is not satisfied, the processing proceeds to step S19.

In a state where the controller 52 determines in step S17 that the control state is not in the second predetermined control state, the processing proceeds to step S20. In step S20, the controller 52 determines whether the second condition determined in advance is satisfied. In a state where the controller 52 determines that the second condition determined in advance is satisfied, the processing proceeds to step S21. In step S21, the controller 52 switches the transmission ratio R from the second transmission ratio R2 to the first transmission ratio R1 and the processing ends. In a state where the controller 52 determines in step S20 that the second condition determined in advance is not satisfied, the processing ends. In the present embodiment, it is possible to change the transmission ratio R and the drive ratio A in order by operating one operation member 46, which can contribute to usability. In a state where the drive ratio A includes a drive ratio A of three or more steps, the same processing as steps S12 to S16 is performed for each drive ratio A.

Fourth Embodiment

A control device 50 in accordance with a fourth embodiment will be described. Since the control device 50 in accordance with the fourth embodiment is the same as the control device 50 in accordance with the third embodiment except that a control state of a controller 52 related to a motor 18 is different from the third embodiment, components common to the third embodiment are denoted by the same reference numerals as those of the third embodiment and will not be described in detail.

The controller 52 is configured to switch a plurality of control states imparting different output characteristics to the motor 18 with respect to human driving force TA. The plurality of control states include a first predetermined control state and a second predetermined control state. A maximum output TM of the motor 18 is different between a first predetermined control state and a second predetermined control state. One of the first predetermined control state and the second predetermined control state can be set to be a control state where the maximum output TM of the motor 18 is 0 watts and the other of the first predetermined control state and the second predetermined control state can be set to be a control state where the maximum output TM of the motor 18 is larger than 0 watts. The first predetermined control state corresponds to, for example, an off mode and any one of first to fifth modes of Table 10. The second predetermined control state corresponds to, for example, a mode different from the first predetermined control state among the off mode and the first to fifth modes of Table 10. The controller 52 switches the control state according to the operation of the operation device 36. The controller 52 switches a transmission ratio R and the control state by the same processing as the processing shown in FIG. 6 of the third embodiment. In the present embodiment, it is possible to change the transmission ratio R and the maximum output TM of the motor 18 in order by operating one operation member 46, which can contribute to usability.

Fifth Embodiment

Figure 7:
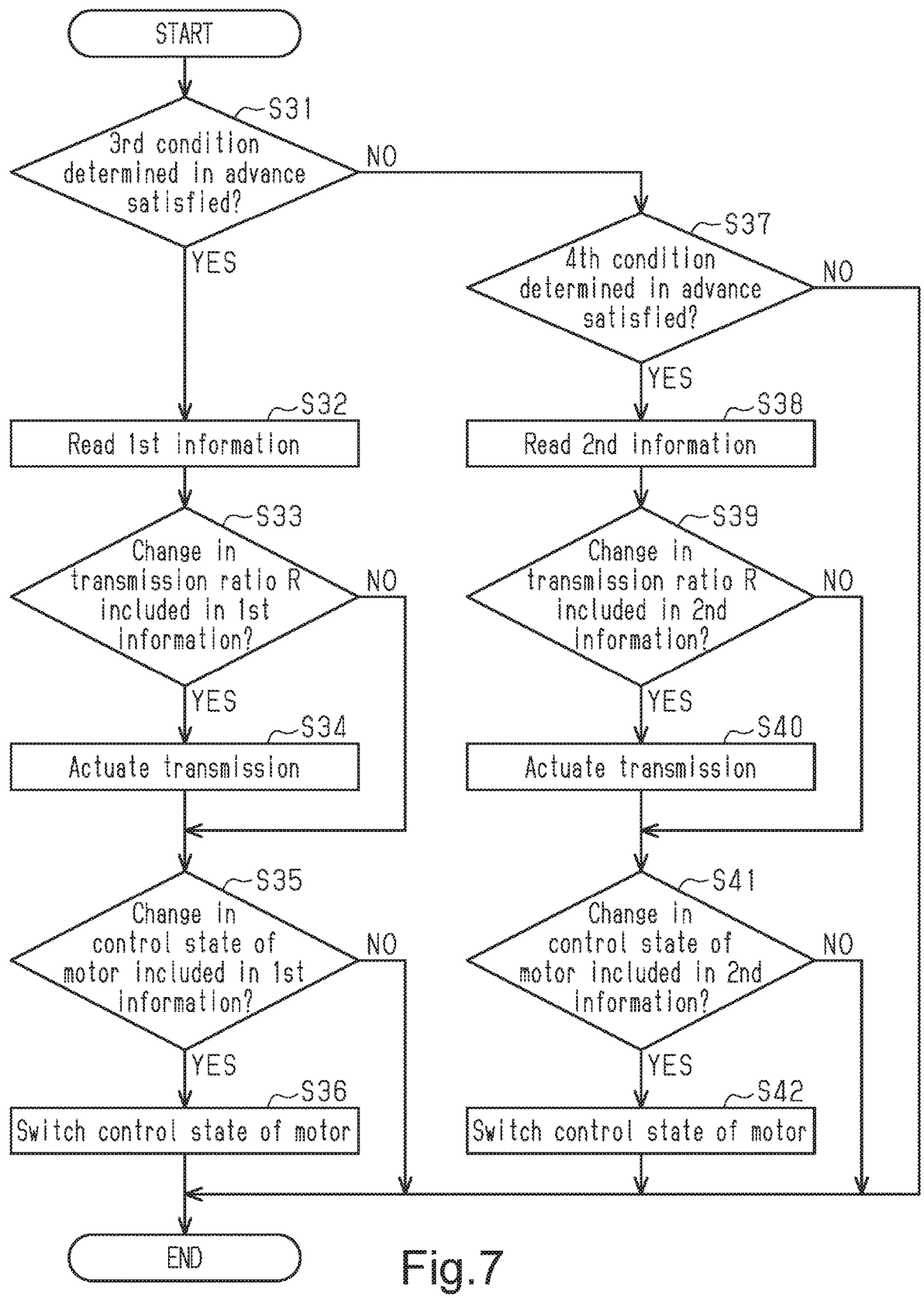
FIG. 7 is a flowchart of a process of switching a transmission ratio and a control state of a motor executed by an electronic controller in accordance with a fifth embodiment.

A control device 50 in accordance with a fifth embodiment will be described with reference to FIG. 7. Since the control device 50 in accordance with the fifth embodiment is the same as the control device 50 in accordance with the first embodiment except that processing of changing a control state and a transmission ratio R is different from the first embodiment, components common to the first embodiment are denoted by the same reference numerals as those of the first embodiment. Such components will not be described in detail.

A first memory device 54 stores stage information obtained by combining the transmission ratio R and a plurality of control states is combined. The stage information includes a combination of the transmission ratio R and the control state at each stage in a state where a traveling load of a human-powered vehicle 10 is changed to be increased and decreased in a stepped manner. In a state where a third condition determined in advance is satisfied, the controller 52 changes at least one of the transmission ratio R and the control state so that the transmission ratio R and the control state are combined at a stage where the traveling load is increased by one step from the currently selected step. In a state where a third condition determined in advance is satisfied, the controller 52 can change only the transmission ratio R, only the control state, or both the transmission ratio R and the control state. In a state where a fourth condition determined in advance is satisfied, the controller 52 changes at least one of the transmission ratio R and the control state so that the transmission ratio R and the control state are combined at a stage where the traveling load is increased by one step from the currently selected step. In a state where a fourth condition determined in advance is satisfied, the controller 52 can change only the transmission ratio R, only the control state, or both the transmission ratio R and the control state.

Table 11 shows an example of the stage information obtained by combining the transmission ratio R with the plurality of control states. Table 11 describes a state where the transmission ratio R is changed to six steps from a transmission ratio R1 to a transmission ratio R6 and a drive ratio A is changed to seven steps from a ratio A1 to a ratio A7. If an operation device is operated, Table 11 includes a state where only the transmission ratio R is changed, only the drive ratio A is changed, and the transmission ratio R and the ratio A1 are changed.

Table 11 includes a state where the ratio A is changed once and a state where the ratio A is changed multiple times, while the transmission ratio R is changed once. Table 11 includes a state where the transmission ratio R is changed once and a state where the transmission ratio R is changed multiple times, while the ratio A is changed once.

TABLE 11

| Stage 1 | Transmission ratio R1 | Ratio A1 |
| Stage 2 | Transmission ratio R1 | Ratio A2 |
| | | (ratio A2 > ratio A1) |

TABLE 11-continued

| | | |
|---|---|---|
| Stage 3 | Transmission ratio R2 (transmission ratio R2 > transmission ratio R1) | Ratio A2 |
| Stage 4 | Transmission ratio R2 | Ratio A3 (ratio A3 > ratio A2) |
| Stage 5 | Transmission ratio R3 (transmission ratio R3 > transmission ratio R2) | Ratio A3 |
| Stage 6 | Transmission ratio R3 | Ratio A4 (ratio A4 > ratio A3) |
| Stage 7 | Transmission ratio R3 | Ratio A5 (ratio A5 > ratio A4) |
| Stage 8 | Transmission ratio R4 (transmission ratio R4 > transmission ratio R3) | Ratio A5 |
| Stage 9 | Transmission ratio R4 | Ratio A6 (ratio A6 > ratio A5) |
| Stage 10 | Transmission ratio R5 (transmission ratio R5 > transmission ratio R4) | Ratio A6 |
| Stage 11 | Transmission ratio R6 (transmission ratio R6 > transmission ratio R5) | Ratio A7 (ratio A7 > ratio A6) |

A third condition determined in advance is satisfied by operating a first operation device 36A. The third condition determined in advance is satisfied, for example, by operating a first operation member 46A of the first operation device 36A. A fourth condition determined in advance is satisfied by operating a second operation device 36B. The fourth condition determined in advance is satisfied, for example, by operating the first operation member 46A of the second operation device 36B. The third condition and the fourth condition that are determined in advance can be satisfied according to at least one of a traveling state and a traveling environment of the human-powered vehicle 10. The third condition and the fourth condition that are determined in advance can be satisfied according to only the traveling state of the human-powered vehicle 10, only the traveling environment of the human-powered vehicle 10, or both or the traveling state and the traveling environment of the human-powered vehicle 10. In this case, it is preferable that the third condition and the fourth condition that are determined in advance be opposite conditions. For example, the third condition determined in advance can also be satisfied according to a traveling load of the human-powered vehicle 10. The fourth condition determined in advance can also be satisfied according to the traveling load of the human-powered vehicle 10. Specifically, in a state where the traveling load of the human-powered vehicle 10 is increased, the controller 52 determines that the third condition determined in advance is satisfied, and in a state where the traveling load of the human-powered vehicle 10 is decreased, the controller 52 determines that the fourth condition determined in advance is satisfied. Alternatively, in a state where the traveling load of the human-powered vehicle 10 is decreased, the controller 52 determines that the third condition determined in advance is satisfied, and in a state where the traveling load of the human-powered vehicle 10 is increased, the controller 52 determines that the fourth condition determined in advance is satisfied.

A process of changing the control state and the transmission ratio R will be described with reference to FIG. 7. If electric power is supplied from a battery 38 to the controller 52, then the controller 52 starts the process and proceeds to step S31 of the flowchart shown in FIG. 7. As long as electric power is supplied, the controller 52 executes processing from step S31 in each predetermined cycle.

In step S31, the controller 52 determines whether the third condition determined in advance is satisfied. In a state where the controller 52 determines that the third condition determined in advance is satisfied, the processing proceeds to step S32. In step S32, the controller 52 reads first information from the first memory device 54 and then proceeds to step S33. The first information includes at least one of the transmission ratio R that needs to be changed to decrease the traveling load by one step from the current step and the control state of the controller 52 related to the motor 18. The first information can include only the transmission ratio R, only the control state, both of the transmission ratio R and the control state. The first information includes, for example, information selected according to the stage order of the above Table 11. In step S33, the controller 52 determines whether the change in the transmission ratio R is included in the first information read in step S32. In a state where the controller 52 determines in step S33 that the first information includes the change in the transmission ratio R, the processing proceeds to step S34. In step S34, the controller 52 actuates the transmission 16 according to the first information, and the process proceeds to step S35. In a state where the controller 52 determines in step S33 that the first information does not include the change in the transmission ratio R, the processing proceeds to step S35.

In step S35, the controller 52 determines whether the change in the control state of the controller 52 related to the motor 18 is included in the first information read in step S32. In a state where the controller 52 determines in step S35 that the first information includes the change in the control state of the controller 52 related to the motor 18, the processing proceeds to step S36. In step S36, the controller 52 switches the control state of the controller 52 related to the motor 18 according to the first information, and the processing ends. In a state where the controller 52 determines in step S35 that the first information does not include the change in the control state of the controller 52 related to the motor 18, the processing ends.

In a state where the controller 52 determines in step S31 that the third condition determined in advance is not satisfied, the processing proceeds to step S37. In step S37, the controller 52 determines whether the fourth condition determined in advance is satisfied. In a state where the controller 52 determines that the fourth condition determined in advance is satisfied, the processing proceeds to step S38. In step S38, the controller 52 reads second information from the first memory device 54 and then proceeds to step S39. The second information includes at least one of the transmission ratio R that needs to be changed to increase the traveling load by one step from the current step and the control state of the controller 52 related to the motor 18. The second information can include only the transmission ratio R, only the control state, or both of the transmission ratio R and the control state. The second information includes, for example, information selected according to the stage order of the above Table 11. In step S39, the controller 52 determines whether the change in the transmission ratio R is included in the second information read in step S38. In a state where the controller 52 determines in step S39 that the second information includes the change in the transmission ratio R, the processing proceeds to step S40. In step S40, the controller 52 actuates the transmission 16 according to the second information, and the process proceeds to step S41. In a state where the controller 52 determines in step S39 that the second information does not include the change in the transmission ratio R, the processing proceeds to step S41.

In step S41, the controller 52 determines whether the change in the control state of the controller 52 related to the motor 18 is included in the second information read in step S38. In a state where the controller 52 determines in step S41 that the second information includes the change in the control state of the controller 52 related to the motor 18, the processing proceeds to step S42. In step S42, the controller 52 switches the control state of the controller 52 related to the motor 18 according to the second information and then ends processing. In a state where the controller 52 determines in step S41 that the first information does not include the change in the control state of the controller 52 related to the motor 18, the processing ends. The third condition determined in advance is satisfied, for example, by operating the second operation member 46B of the second operation device 36B.

Modification

The description of the above embodiments is merely an example of a mode that can be taken by the control device for a human-powered vehicle according to the present disclosure, and is not intended to limit the embodiments. The control device for a human-powered vehicle according to the present disclosure can take a form in which, for example, modifications of each of the above-described embodiments to be described later and at least two modifications not contradictory with each other are combined. In the following modifications, components common to each of the embodiments are denoted by the same reference numerals as those of the embodiments. Such components will not be described in detail.

In the first and second embodiments, the transmission 16 can be omitted. In each embodiment, the operation device 36 can be configured not to include a brake lever 48. In short, the operation device 36 can have any configuration as long as it includes at least one operation member 46.

In the first and second embodiments, the transmission 16 can be configured to be driven by a Bowden cable. In this case, the operation device 36 is provided with a cable control mechanism for controlling the transmission 16 and a shift lever for controlling the cable control mechanism.

The first embodiment and the second embodiment can be combined. For example, upon determining the operation member 46 has been operated, the controller 52 can change a control state so as to change both a drive ratio A and a maximum output TM of a motor 18. Table 12 shows a first example of a control operation of the controller 52 stored in a first memory device 54 in a state where the first embodiment and the second embodiment are combined.

TABLE 12

| Control operation |
|---|
| 1 Shift up of front derailleur |
| 2 Shift down of front derailleur |
| 3 Shift up of rear derailleur |
| 4 Shift down of rear derailleur |
| 5 Change control state so that ratio and maximum output of motor are increased |
| 6 Change control state so that ratio and maximum output of motor are decreased |

Table 13 shows a second example of the control operation of the controller 52 stored in the first memory device 54 in a state where the first embodiment and the second embodiment are combined.

TABLE 13

| Operation |
|---|
| 1 Shift up of front derailleur |
| 2 Shift down of front derailleur |
| 3 Shift up of rear derailleur |
| 4 Shift down of rear derailleur |
| 5 Change control state so that ratio is increased |
| 6 Change control state so that ratio is decreased |
| 7 Change control state so that maximum output of motor is increased |
| 8 Change control state so that maximum output of motor is decreased |
| 9 Change control state so that ratio and maximum output of motor are increased |
| 10 Change control state so that ratio and maximum output of motor are decreased |

Even in a state where the first embodiment and the second embodiment are combined, information on the combination of each operation member 46 and the control operation in a state where each operation member 46 is operated is changeable by an external device P.

Table 14 shows an example of the combination stored in the first memory device 54 in a state where the first embodiment and the second embodiment are combined.

TABLE 14

| Operation member | Control operation |
|---|---|
| First operation member of first operation device | Shift up of rear derailleur |
| Second operation member of first operation device | Shift down of rear derailleur |
| Third operation member of first operation device | Change control state so that ratio is decreased |
| Fourth operation member of first operation device | Change control state so that maximum output of motor is decreased |
| First operation member of second operation device | Shift down of front derailleur |
| Second operation member of second operation device | Shift up of front derailleur |
| Third operation member of second operation device | Change control state so that ratio is increased |
| Fourth operation member of second operation device | Change control state so that maximum output of motor is increased |

Figure 8:
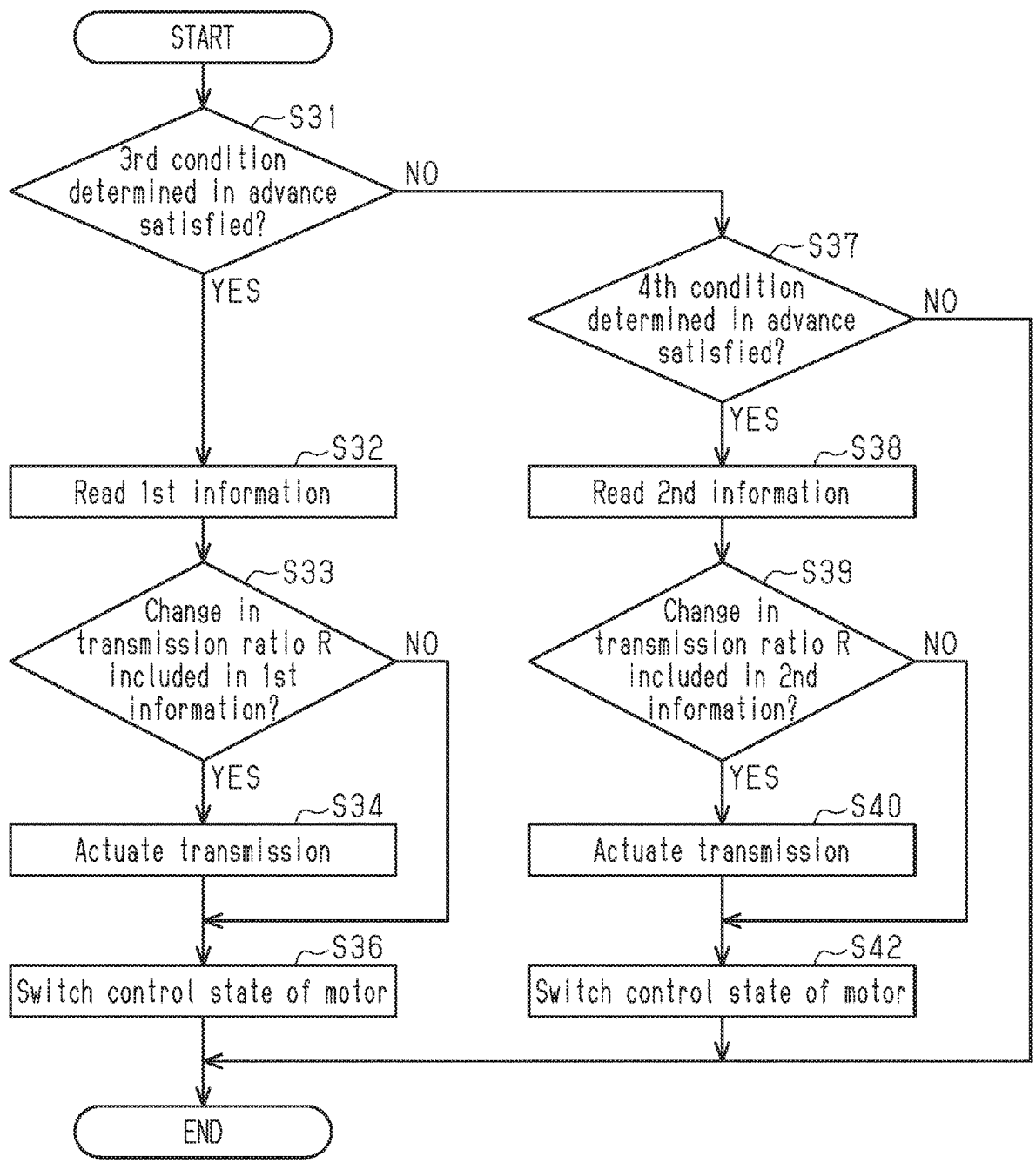
FIG. 8 is a flowchart of a process of switching a transmission ratio and a control state of a motor executed by an electronic controller in accordance with a modification of the fifth embodiment.

In a state where the first embodiment and the second embodiment are combined, the controller 52 preferentially executes an off mode. Thus, it is possible to shift the controller 52 to the off mode by changing the control state so that the drive ratio A decreased without setting the maximum output TM of the motor 18, and it is possible to shift the controller 52 to the off mode by changing the control state so that the maximum output TM of the motor 18 is decreased without setting the drive ratio A In the fifth embodiment, only one of the transmission ratio R and the drive ratio A can also be changed in a state where a traveling load of the human-powered vehicle 10 is changed to be increased and decreased in a stepped manner. In this case, as shown in FIG. 8, it is also possible to omit step S35 and step S41 which are the processes of changing the control state and the transmission ratio R in FIG. 7.

Table 15 shows an example of stage information obtained by combining the transmission ratio R with the plurality of control states in a state where only one of the transmission ratio R and the motor 18 is changed. Table 15 describes a state where the transmission ratio R is changed to five steps from a transmission ratio R1 to a transmission ratio R5 and a drive ratio A is changed to seven steps from a ratio A1 to a ratio A7. Table 15 includes a state where the drive ratio A is changed once and a state where the drive ratio A is changed multiple times, while the transmission ratio R is changed once. Table 15 includes a state where the transmission ratio R is changed once and a state where the transmission ratio R is changed multiple times, while the drive ratio A is changed once.

TABLE 15

| Stage 1 | Transmission ratio R1 | Ratio A1 |
|---|---|---|
| Stage 2 | Transmission ratio R1 | Ratio A2 (ratio A2 > ratio A1) |
| Stage 3 | Transmission ratio R2 (transmission ratio R2 > transmission ratio R1) | Ratio A2 |
| Stage 4 | Transmission ratio R2 | Ratio A3 (ratio A3 > ratio A2) |
| Stage 5 | Transmission ratio R3 (transmission ratio R3 > transmission ratio R2) | Ratio A3 |
| Stage 6 | Transmission ratio R3 | Ratio A4 (ratio A4 > ratio A3) |
| Stage 7 | Transmission ratio R3 | Ratio A5 (ratio A5 > ratio A4) |
| Stage 8 | Transmission ratio R4 (transmission ratio R4 > transmission ratio R3) | Ratio A5 |
| Stage 9 | Transmission ratio R4 | Ratio A6 (ratio A6 > ratio A5) |
| Stage 10 | Transmission ratio R5 | Ratio A6 |
| Stage 11 | Transmission ratio R5 | Ratio A7 (ratio A7 > ratio A6) |

In the fifth embodiment and the modification thereof, the controller 52 can also control the motor 18 so that the maximum output TM of the motor 18 is different in each of the plurality of control states.

Table 16 shows an example of the stage information obtained by combining the transmission ratio R with the plurality of control states. Table 16 describes a state where the transmission ratio R is changed to six steps from a transmission ratio R1 to a transmission ratio R6 and the maximum output TM of the motor 18 is changed to seven steps from a maximum output TM1 to a maximum output TM7 of the motor 18. Table 16 includes a state where only the transmission ratio R is changed, only the maximum output TM of the motor 18 is changed, and the transmission ratio R and the maximum output TM of the motor 18 are changed, upon determining an operation device 36 has been operated. Table 16 includes a state where the maximum output TM of the motor 18 is changed once and a state where the maximum output TM of the motor 18 is changed multiple times, while the transmission ratio R is changed once. Table 16 includes a state where the transmission ratio R is changed once and a state where the transmission ratio R is changed multiple times, while the maximum output TM of the motor 18 is changed once. Even in the modification, only one of the transmission ratio R and the maximum output TM of the motor 18 can also be changed in a state where a traveling load of the human-powered vehicle 10 is changed to be increased and decreased in a stepped manner.

TABLE 16

| Stage 1 | Transmission ratio R1 | Maximum output TM1 |
|---|---|---|
| Stage 2 | Transmission ratio R1 | Maximum output TM2 (maximum output TM2 > maximum output TM1) |
| Stage 3 | Transmission ratio R2 (transmission ratio R2 > transmission ratio R1) | Maximum output TM2 |
| Stage 4 | Transmission ratio R2 | Maximum output TM3 (maximum output TM3 > maximum output TM2) |
| Stage 5 | Transmission ratio R3 (transmission ratio R3 > transmission ratio R2) | Maximum output TM3 |
| Stage 6 | Transmission ratio R3 | Maximum output TM4 (maximum output TM4 > maximum output TM3) |
| Stage 7 | Transmission ratio R3 | Maximum output TM5 (maximum output TM5 > maximum output TM4) |
| Stage 8 | Transmission ratio R4 (transmission ratio R4 > transmission ratio R3) | Maximum output TM5 |
| Stage 9 | Transmission ratio R4 | Maximum output TM6 (maximum output TM6 > maximum output TM5) |
| Stage 10 | Transmission ratio R5 (transmission ratio R5 > transmission ratio R4) | Maximum output TM6 |
| Stage 11 | Transmission ratio R6 (transmission ratio R6 > transmission ratio R5) | Maximum output TM7 (maximum output TM7 > maximum output TM6) |

In the fifth embodiment and the modification thereof, the controller 52 can also control the motor 18 so that at least one of the drive ratio A and the maximum output TM of the motor 18 is different in each of the plurality of control states. The controller 52 can also control the motor 18 so that only the drive ratio A, only the maximum output TM, or both of the drive ratio A and the maximum output TM is/are different in each of the plurality of control states.

In each embodiment, in a state where the transmission ratio R is changed and the motor 18 is being driven, the controller 52 can control the output of the motor 18 to be smaller than or equal to a predetermined value and then actuate the transmission 16. In one example, the predetermined value is 0 watts.

In each embodiment, the transmission 16 can include an internal transmission in place of at least one of a front derailleur 16A and a rear derailleur 16B or in addition to the front derailleur 16A and the rear derailleur 16B. The internal transmission is provided, for example, on a hub body of the driving wheel 14. In this case, for example, upon determining the first operation member 46A of the first operation device 36A is operated, at least one of the front derailleur 16A, the rear derailleur 16B, and the internal transmission can be configured to be actuated so that the transmission ratio R is increased, and upon determining the first operation member 46A of the second operation device 36B is operated, at least one of the front derailleur 16A, the rear derailleur 16B, and the internal transmission can be configured to be actuated so that the transmission ratio R is decreased.

The third embodiment and the fourth embodiment can be combined. In this case, in the step of switching the control state related to the motor 18, the controller 52 changes both the drive ratio A and the maximum output TM of the motor 18.

In the first embodiment and the modification thereof, the controller 52 can be configured to control the motor 18 so that an additional value W0 of the output of the motor 18 with respect to human driving force TA is different in at least three control states. The at least three control states includes a first control state where the additional value W0 of the output of the motor 18 is a first additional value W1, a second control state where the additional value W0 of the output of the motor 18 is a second additional value W2 larger than the first additional value W1, and a third control state where the additional value W0 of the output of the motor 18 is a third additional value W3 larger than the second additional value W2, and a difference between the second additional value W2 and the first additional value W1 and a difference between the third additional value W3 and the second additional value W2 are smaller than or equal to 30 watts. The controller 52 controls the motor 18 so that a temporary output of the motor 18 whose ratio of the human driving force and the output of the motor 18 is a reference ratio is calculated and the value obtained by adding the additional value W0 corresponding to each mode to the value of the temporary output becomes the output of the motor 18.

Table 17 shows an example of the relationship between the plurality of control states stored in the first memory device 54 and the additional value W0 of the outputs of the motor 18 corresponding to each of the plurality of control states. The control states include an off mode, a first mode, a second mode, a third mode, a fourth mode, and a fifth mode. The additional value W0 is the power of the motor 18. The values of W1, W2, W3, W4, and W5 are changeably stored in the first memory device 54 or the second memory device 56. For example, upon determining the third operation member 46C of the first operation device 36A has been operated once, the controller 52 changes the control state so that the additional value W0 is increased by one step. Upon determining the third operation member 46C of the first operation device 36A has been operated in the off mode, the controller 52 changes the mode in the order of the first mode, the second mode, the third mode, the fourth mode, and the fifth mode. For example, upon determining the third operation member 46C of the second operation device 36B has been operated once, the controller 52 changes the control state so that the additional value W0 is decreased by one step. Upon determining the third operation member 46C of the second operation device 36B has been operated in the fifth mode, the controller 52 changes the mode in the order of the fourth mode, the third mode, the second mode, the first mode, and the off mode. In at least three modes, a change amount WS of the additional value W0 in a state where the additional value W0 is changed by only one step is set to be in the range of 10 watts or more and 30 watts or less. For example, a value obtained by subtracting the additional value W1 from the additional value W2 and a value obtained by subtracting the additional value W2 from the additional value W3 are values in the range of 10 watts or more and 30 watts or less. In addition, for example, a value obtained by subtracting the additional value W1 from the additional value W2, a value obtained by subtracting the additional value W2 from the additional value W3, and a value obtained by subtracting the additional value W3 from the additional value W4 are values in the range of 10 watts or more and 30 watts or less. In five or more modes, the change amount WS of the additional value W0 in a state where the additional value W0 is changed by one step can also be set to be in the range of 10 watts or more and 30 watts or less. In a mode in which the additional value W0 is maximized, the change amount WS of the additional value W0 in a state where the additional value W0 is changed by one step can be set to be in the range of 100 watts or more and 300 watts or less. For example, a value obtained by subtracting the additional value W4 from the additional value W5 is values in the range of 100 watts or more and 300 watts or less.

TABLE 17

|  | Drive Ratio A | Additional value W0 of output of motor |
|---|---|---|
| Off mode | 0% | 0 |
| First mode | Reference ratio | W1 |
| Second mode | Reference ratio | W2 |
| Third mode | Reference ratio | W3 |
| Fourth mode | Reference ratio | W4 |
| Fifth mode | Reference ratio | W5 |

Thus, the foregoing descriptions of the embodiments according to the present invention are provided for illustration only, and not for the purpose of limiting the invention as defined by the appended claims and their equivalents.

What is claimed is:

1. A human-powered vehicle control device comprising:
   an electronic controller configured to control a motor that assists in propulsion of a human-powered vehicle in accordance with a human driving force input to the human-powered vehicle; and
   a sensor configured to detect the human driving force input to the human-powered vehicle and configured to communicate the detected input human driving force to the electronic controller,
   the electronic controller being further configured to switch at least five control states imparting different output characteristics to the motor with respect to the human driving force,
   the output characteristic being a drive ratio of an output of the motor to the input human driving force, and the drive ratio being different for each of the output characteristics.

2. The human-powered vehicle control device according to claim 1, wherein
   the electronic controller is configured to control the motor so that the drive ratio is smaller than or equal to 300% in five or more control states out of the at least five control states.

3. The human-powered vehicle control device according to claim 1, wherein
   the electronic controller is configured to change a maximum output of the motor in the at least five control states.

4. The human-powered vehicle control device according to claim 3, wherein
   the electronic controller is configured to control the motor so that the maximum output of the motor is smaller than or equal to 500 watts in five or more control states out of the at least five control states.

5. The human-powered vehicle control device according to claim 4, wherein
   the electronic controller is configured to control the motor so that the maximum output of the motor is smaller than or equal to 200 watts in the five or more control states.

6. The human-powered vehicle control device according to claim 1, wherein
   the electronic controller is configured to switch the control state according to an operation of an operation device of the human-powered vehicle.

7. The human-powered vehicle control device according to claim 1, wherein
   the number of the control states is changeable by an external device.

8. A human-powered vehicle control device comprising:
   an electronic controller configured to control a motor that assists in propulsion of a human-powered vehicle in accordance with a human driving force input to the human-powered vehicle; and a first memory device configured to changeably store the drive ratio of each of the at least five control states, the electronic controller being further configured to switch at least five control states imparting different output characteristics to the motor with respect to the human driving force, the electronic controller being further configured to control the motor such that a drive ratio of an output of the motor to the human driving force is different in the at least five control states, and the first memory device being configured so that the drive ratio is changeably stored in the first memory device by an external device.

9. A human-powered vehicle control device comprising:
an electronic controller configured to control a motor that assists in propulsion of a human-powered vehicle in accordance with a human driving force input to the human-powered vehicle; and a second memory device configured to changeably store the maximum output of the motor for each of the at least five control states, the electronic controller being further configured to switch at least five control states imparting different output characteristics to the motor with respect to the human driving force, the electronic controller being further configured to change a maximum output of the motor in the at least five control states, and the second memory device being configured so that the maximum output of the motor is changeably stored in the first memory device by an external device.

10. A human-powered vehicle control device for a human-powered vehicle comprising:
an electronic controller configured to control a motor that assists in propulsion of a human-powered vehicle in accordance with a human driving force input to the human-powered vehicle, the electronic controller being configured to switch at least three control states imparting different output characteristics to the motor with respect to the human driving force, and the electronic controller being configured to control the motor so that a drive ratio of an output of the motor to the human driving force input to the human-powered vehicle is different in each of the at least three control states, the at least three control states includes a first control state where the drive ratio is a first ratio, a second control state where the drive ratio is a second ratio larger than the first ratio, and a third control state where the drive ratio is a third ratio larger than the second ratio, and a difference between the first ratio and the second ratio and a difference between the second ratio and the third ratio are each smaller than or equal to 30%.

11. The human-powered vehicle control device according to claim 10, wherein
the difference between the first ratio and the second ratio and the difference between the second ratio and the third ratio are each less than 10%.

12. The human-powered vehicle control device according to claim 10, wherein
the at least three control states further include a fourth control state where the ratio is a fourth ratio larger than the third ratio, and a difference between the fourth ratio and the third ratio is larger than 30% and smaller than or equal to 300%.

13. The human-powered vehicle control device according to claim 10, wherein
the electronic controller is configured to switch at least five control states imparting different output characteristics to the motor with respect to the human driving force.

14. A human-powered vehicle control device comprising:
an electronic controller configured to control a motor that assists in propulsion of a human-powered vehicle in accordance with a human driving force input to the human-powered vehicle, the electronic controller being configured to switch at least three control states imparting different output characteristics to the motor with respect to the human driving force, and the electronic controller being configured to control the motor so that a maximum output of the motor is different in each of the at least three control states, the at least three control states includes a first control state where the maximum output of the motor is a first predetermined value, a second control state where the maximum output of the motor is a second predetermined value larger than the first predetermined value, and a third control state where the maximum output of the motor is a third predetermined value larger than the second predetermined value, and a difference between the first predetermined value and the second predetermined value and a difference between the second predetermined value and the third predetermined value are each smaller than or equal to 30 watts.

15. The human-powered vehicle control device according to claim 14, wherein
a difference between the first predetermined value and the second predetermined value and a difference between the second predetermined value and the third predetermined value are each smaller than or equal to 20 watts.

16. The human-powered vehicle control device according to claim 14, wherein
the at least three control states further include a fourth control state where the maximum output of the motor is a fourth predetermined value larger than the third predetermined value, and a difference between the third predetermined value and the fourth predetermined value is larger than 30 watts and smaller than or equal to 200 watts.

17. A human-powered vehicle control device for a human-powered vehicle that includes an input rotary body to which human driving force is input, a driving wheel driven by rotating the input rotary body, a transmission for shifting a transmission ratio which is a ratio of a rotational speed of the driving wheel to a rotational speed of the input rotary body, and a motor that assists in propulsion of the human-powered vehicle, the human-powered vehicle control device comprising:

an electronic controller configured to control the motor and the transmission, the electronic controller being configured to switch a plurality of control states imparting different output characteristics to the motor with respect to the human driving force, the plurality of control states include a first predetermined control state and a second predetermined control state, the electronic controller being configured to switch the control state to the second predetermined control state without actuating the transmission upon determining the transmission ratio is a first transmission ratio and a first condition determined in advance is satisfied in the first predetermined control state, and the electronic controller being configured to actuate the transmission to switch the transmission ratio from the first transmission ratio to a second transmission ratio upon determining the transmission ratio is a first transmission ratio and the first condition determined in advance is satisfied in the second predetermined control state.

18. The human-powered vehicle control device according to claim 17, wherein the first condition determined in advance is satisfied by operating a first operation device.

19. The human-powered vehicle control device according to claim 17, wherein the electronic controller is configured to switch the control state to the first predetermined control state without actuating the transmission upon determining the transmission ratio is a second transmission ratio and a second condition differing from the first condition determined in advance is satisfied in the second predetermined control state, and the electronic controller is configured to actuate the transmission to switch the transmission ratio from the second transmission ratio to the first transmission ratio upon determining the transmission ratio is a second transmission ratio and the second condition determined in advance is satisfied in the first predetermined control state.

20. The human-powered vehicle control device according to claim 19, wherein the second condition determined in advance is satisfied by operating a second operation device.

21. The human-powered vehicle control device according to claim 17, wherein a drive ratio of an output of the motor to the human driving force differs between the first predetermined control state and the second predetermined control state.

22. The human-powered vehicle control device according to claim 17, wherein a maximum output of the motor differs between the first predetermined control state and the second predetermined control state.

23. A human-powered vehicle control device comprising:

an electronic controller configured to control a motor that assists in propulsion of the human-powered vehicle in accordance with a human driving force input to the human-powered vehicle; and a sensor configured to detect the human driving force input to the human-powered vehicle and configured to communicate the detected input human driving force to the electronic controller, the electronic controller being configured to switch a plurality of control states imparting different output characteristics to the motor with respect to the human driving force, the output characteristic being a ratio of an output of the motor to the input human driving force, the drive ratio being different for each of the output characteristics, and the number of the control states is changeable by an external device.

* * * * *